(12) United States Patent
Joshi et al.

(10) Patent No.: US 10,390,046 B2
(45) Date of Patent: Aug. 20, 2019

(54) CODING SIGNIFICANT COEFFICIENT INFORMATION IN TRANSFORM SKIP MODE

(71) Applicant: QUALCOMM Incorporated, San Diego, CA (US)

(72) Inventors: Rajan Laxman Joshi, San Diego, CA (US); Joel Sole Rojals, La Jolla, CA (US); Xianglin Wang, San Diego, CA (US); Marta Karczewicz, San Diego, CA (US); Vadim Seregin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 641 days.

(21) Appl. No.: 13/670,167

(22) Filed: Nov. 6, 2012

(65) Prior Publication Data
US 2013/0114730 A1 May 9, 2013

Related U.S. Application Data

(60) Provisional application No. 61/588,124, filed on Jan. 18, 2012, provisional application No. 61/583,569, (Continued)

(51) Int. Cl.
*H04N 19/70* (2014.01)
*H04N 19/196* (2014.01)
(Continued)

(52) U.S. Cl.
CPC ............. *H04N 19/70* (2014.11); *H04N 19/12* (2014.11); *H04N 19/129* (2014.11);
(Continued)

(58) Field of Classification Search
CPC ........... H04N 7/30; H04N 19/21; H04N 19/13
(Continued)

(56) References Cited

U.S. PATENT DOCUMENTS 7,379,607 B2 * 5/2008 Srinivasan ........... H04N 19/105
375/E7.125
8,045,612 B1 10/2011 Bao et al.
(Continued)

FOREIGN PATENT DOCUMENTS

WO 2008157268 12/2008
WO 2009105726 A1 8/2009
(Continued)

OTHER PUBLICATIONS

An, et al., "Non-CE7: Boundary-Development Transform for Inter-Predicted Residue," Document JCTVC-G281, 7th Meeting: Geneva, CH, Nov. 21-30, 2011, 11 pp.
(Continued)

*Primary Examiner* — Mohammed S Rahaman
*Assistant Examiner* — Jimmy S Lee
(74) *Attorney, Agent, or Firm* — Shumaker & Sieffert, P.A.

(57) ABSTRACT

This disclosure describes techniques for coding significant coefficient information for a video block in a transform skip mode. The transform skip mode may provide a choice of a two-dimensional transform mode, a horizontal one-dimensional transform mode, a vertical one-dimensional transform mode, or a no transform mode. In other cases, the transform skip mode may provide a choice between a two-dimensional transform mode and a no transform mode. The techniques include selecting a transform skip mode for a video block, and coding significant coefficient information for the video block using a coding procedure defined based at least in part on the selected transform skip mode. Specifically, the tech-
(Continued)

niques include using different coding procedures to code one or more of a position of a last non-zero coefficient and a significance map for the video block in the transform skip mode.

44 Claims, 14 Drawing Sheets

Related U.S. Application Data filed on Jan. 5, 2012, provisional application No. 61/556,721, filed on Nov. 7, 2011, provisional application No. 61/556,750, filed on Nov. 7, 2011.

(51) Int. Cl.
| | |
|---|---|
| H04N 19/129 | (2014.01) |
| H04N 19/12 | (2014.01) |
| H04N 19/156 | (2014.01) |
| H04N 19/625 | (2014.01) |
| H04N 19/463 | (2014.01) |

(52) U.S. Cl.
CPC ......... *H04N 19/156* (2014.11); *H04N 19/196* (2014.11); *H04N 19/625* (2014.11); *H04N 19/463* (2014.11)

(58) Field of Classification Search
USPC ...................................................... 375/240.18
See application file for complete search history.

(56) References Cited

U.S. PATENT DOCUMENTS

| | | | |
|---|---|---|---|
| 8,571,104 B2 | 10/2013 | Ye et al. | |
| 9,008,171 B2 | 4/2015 | Karczewicz et al. | |
| 2003/0113026 A1* | 6/2003 | Srinivasan et al. | 382/239 |
| 2004/0008898 A1* | 1/2004 | Song | H04N 19/176 382/250 |
| 2006/0088222 A1* | 4/2006 | Han | H04N 19/00 382/232 |
| 2007/0047644 A1* | 3/2007 | Lee | H04N 19/176 375/240.1 |
| 2007/0237235 A1 | 10/2007 | Krishnan | |
| 2010/0150226 A1 | 6/2010 | Hallapuro et al. | |
| 2010/0290520 A1 | 11/2010 | Kamisli et al. | |
| 2011/0026583 A1* | 2/2011 | Endresen | H04N 19/176 375/240.02 |
| 2011/0090954 A1 | 4/2011 | Cohen et al. | |
| 2011/0150072 A1* | 6/2011 | Han | H04N 19/51 375/240.01 |
| 2011/0292044 A1* | 12/2011 | Kim | H04N 19/597 345/419 |
| 2012/0008682 A1 | 1/2012 | Karczewicz et al. | |
| 2012/0082235 A1* | 4/2012 | Lou | H04N 19/176 375/240.18 |
| 2013/0003838 A1* | 1/2013 | Gao | H04N 19/176 375/240.12 |
| 2013/0058418 A1* | 3/2013 | Lu | H03M 7/4006 375/240.18 |

FOREIGN PATENT DOCUMENTS

| | | |
|---|---|---|
| WO | 2011128303 A2 | 10/2011 |
| WO | 2011142817 A1 | 11/2011 |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Chien, et al., "Last position coding for CABAC," JCTVC-G704, 7th Meeting: Geneva, Nov. 21-30, 2011, 4 pp.

International Search Report and Written Opinion—PCT/US2012/063876—ISA/EPO—dated Apr. 11, 2013, 24 pp.

Joshi, et al., "CE5: Subtest d: Modifications to last significant coefficient position coding for transform skip mode", MPEG Meeting; Jun. 2, 2012-Oct. 2, 2012; San Josa CR; (Motion Picture Expert Group or ISO/IEC JTC1/SC29/WG11), No. m23328, XP030051853, 4 pp.

Joshi, et al., "AHG19: Modification to HE transform coefficient coding for transform skip mode", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-G663, XP030110647, 3 pp.

Min, et al., "Adaptive significance map coding for large transform", JCT-VC Meeting, Jul. 14, 2011-Jul. 22, 2011, Torino, (Joint Collaborative Team on Video Coding of ISO/IEC JTC1/SC29/WG11 and ITU-T SG.16 ), URL: http://wftp3.itu.int/av-arch/jctvc-site/, No. JCTVC-F598, XP030009621, 3 pp.

Nguyen, et al., "Modified binarization and coding of MVD for PIPE/CABACU", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-TSG. 16 ) ; URL: http://wftp3.itu.int/av-arch/jctvc-site/, No. JCTVC-F455, XP030009478, 2 pp.

Partial International Search Report—PCT/US2012/063876—ISA/EPO—dated Feb. 11, 2013, 9 pp.

Seregin, et al., "Binarisation modification for last position coding," JCTVC-F375, Joint Collaborative Team on Video Coding (JCT-VC) of ITU-T SG16 WP3 and ISO/IEC JTC1/SC29/WG11, 6th Meeting: Torino, IT, Jul. 14-22, 2011, 10 pp.

Sohn, et al., "One Dimensional Transform for H.264 Based Intra Coding (Abstract)", Picture Coding Symposium; Jul. 11, 2007-Sep. 11, 2007; Lisbon, 4 Pages, XP030080458, 4 pp.

Sole, et al., "Parallel Context Processing for the significance map in high coding efficiency ", MPEG Meeting; Jan. 24, 2011-Jan. 28, 2011; Daegu; (Motion Picture Expert Group or ISO/IEC JTC1/SC29/WG11) No. m1902, XP030047594, 4 pp.

Sullivan, et al., "Meeting report of the sixth meeting of the Joint Collaborative Team on Video Coding (JCT-VC)", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16 ); URL: http://wftp3.1tu.i nt/ a v -arch/jctvc-site/, No. JCTVC-F_Notes_d7, XP030009032, 183 pp. [uploaded in parts].

Winken, et al., "Video coding technology proposal by Fraunhofer HHI", JCT-VC Meeting; Apr. 15, 2010-Apr. 23, 2010; Dresden; (Jointcollaborative Team on Video Coding of ISO/IEC JTC1/SC29/WG11 and ITU-TSG.16) ; URL: http://wftp3. itu. int/av-arch/jctvc-site/, No. XP030007556, XP030007557, 44 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2012/063876, dated Dec. 9, 2013, 11 pp.

International Preliminary Report on Patentability from International Application No. PCT/US2012/063876, dated Feb. 18, 2014, 10 pp.

Sole, et al. "RCE2 Test B.1: Residue rotation and significance map context," 14th Meeting, Document: JCTVC-N0044, Vienna, AT, Jul. 25-Aug. 2, 2013, 7 pp.

He, et al., "Rotation of Residual Block for Transform Skipping," 10th Meeting, Document: JCTVC-J0093, Stockholm, SE, SE, Jul. 11- 20, 2012, 8 pp.

Tsukuba, et al., "Constant coefficent context for intra transform skipping," 10th Meeting, Document: JCTVC-J0069, Stockholm, SE, Jul. 11-20, 2012, 8 pp.

Tsukuba, et al., "Combination of JCTVC-J0069 and JCTVC-J0093," 10th Meeting, Document: JCTVC-J0468, Stockholm, SE, Jul. 11-20, 2012, 5 pp.

(56) References Cited

OTHER PUBLICATIONS

Sole, et al., "AhG8: Residue rotation and significance map context for screen content coding," 13th Meeting, Document: JCTVC-M0333, Apr. 18-26, 2013, 5 pp.
Joshi, et al., "HECVC Range Extensions Core Experiment 2 (RCE2): Prediction and coding techniques for transform-skip and transform-bypass blocks," 13th Meeting, Document: JCTVC-M1122_r1, Apr. 18-26, 2013, 5 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
An et al., "Boundary-Dependent Transform for Inter-Predicted Residue," JCTVC-G281, PowerPoint presentation, 7th JCTVC Meeting, Geneva, CH, Nov. 21-30, 2011, 13 slides.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d21, 290 pp.
Bross et al., "High efficiency video coding (HEVC) text specification draft 8," 10th Meeting: Stockholm, SE, Jul. 11-20, 2012, JCTVC-J1003_d7, 261 pp.
Mrak et al., "Transform Skip Mode," JCTVC-F077_r1, 6th Meeting: Torino, IT, Jul. 14-22, 2011, 9 pp.
Mrak et al., "JCTVC-F077—Transform Skip Mode," PowerPoint presentation, 6th Meeting: Torino, IT, Jul. 14-22, 7 slides.
Bross et al., "High efficiency video coding (HEVC) text specification draft 9," 11th Meeting: Shanghai, CN, Oct. 10-19, 2012, JCTVC-K1003_v7, 290 pp.

Bossen, "Common Test Conditions and Software Reference Configurations", Jan. 20-28, 2011; Joint Collaborative Team on Video Coding (JCT-VC) of ITU-T SG16 WP3 and ISO/IEC JTC1/SC29/WG11, JCTVC-E700 WG11 No. m20235, 4th Meeting: Daegu, KR, Apr. 25, 2011, 11 pp.
Fuldseth, et al., "Transform design for HEVC with 16 bit intermediate data representation", ITU-T SG16 WP3 and ISO/IEC JTC1/SC29/WG11, Document JCTVC-E243, 5th JCT-VC Meeting, Mar. 16-23, 2011, Geneva, CH, No. JCTVC-E243, Mar. 18, 2011, XP030048334, 16 pp.
Saxena, et al., "CE7: Mode-dependent DCT/DST without 4*4 full matrix multiplication for intra prediction," MPEG Meeting; Mar. 21-25, 2011; Geneva; (Motion Picture Expert Group or ISO/IEC JTC1/SC29/WG11), No. m19640, JCTVC-E125, Mar. 20, 2011, XP030048207, 10 pp.
Wiegand, et al., "WD3: Working Draft 3 of High-Efficiency Video Coding", Joint Collaborative Team on Video Coding (JCT-VC) of ITU-T SG16 WP3 and ISO/IEC JTC1/SC29/WG11, Document JCTVC-E603_d1, 5th Meeting: Geneva, CH, Mar. 16-23, 2011, Mar. 30, 2011; 167 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Bossen, "Common Test Conditions and Software Reference Configurations," Jul. 14-22, 2011; Joint Collaborative Team on Video Coding (JCT-VC), ITU-T SG16 WP3 and ISO/IEC JTC1/SC29/WG1, 6th Meeting: Torino, IT, JCTVC-F900, Sep. 12, 2011, 3 pp.
Sole, et al., "CE11: Parallel Context Processing for the significance map in high coding efficiency", JCT-VC Meeting; MPEG Meeting; Mar. 16-23, 2011; Geneva; (Joint Collaborative Team on Video Coding of ISO/IEC JTC1/SC29/WG11and ITU-T SG.16); URL: http://wftp3.itu.int/av-arch/jctvc-site/ No. JCTVC-E338, Mar. 11, 2011, 5 pp., XP030008844, ISSN: 0000-0005.
Sole, et al., "Parallel Context Processing for the significance map in high coding efficiency", JCT-VC Meeting; MPEG Meeting; Jan. 20-28, 2011; Daegu; (Joint Collaborative Team on Video Coding of ISO/IEC JTC1/SC29/WG11 and ITU-T SG. 16); URL: http://wftp3.itu.int/av-arch/jctvc-site/, No. JCTVC-D262, XP030008302, 4 pp.
Xu, et al., "Improvements on Last Nonzero Position Coding of 4x4 TU in CAVLC", Joint Collaborative Team on Video Coding (JCT-VC) of ITU-T SG16 WP3 and ISO/IEC JTC1/SC29/WG11, Document: JCTVC-F287 (version 3), Jul. 14-22, 2011, 8 pp.
Zheng, et al., "CE11: Mode Dependent Coefficient Scanning", JCT-VC Meeting; MPEG Meeting; Jan. 20-28, 2011; Daegu; (Joint Collaborative Team on Video Coding of ISO/IEC JTC1/SC29/WG11and ITU-T SG.16); No. JCTVC-D393, XP030008432, 4 pp.

* cited by examiner

CODING SIGNIFICANT COEFFICIENT INFORMATION IN TRANSFORM SKIP MODE

This application claims the benefit of:

U.S. Provisional Application No. 61/556,721, filed Nov. 7, 2011;

U.S. Provisional Application No. 61/556,750, filed Nov. 7, 2011;

U.S. Provisional Application No. 61/583,569, filed Jan. 5, 2012; and

U.S. Provisional Application No. 61/588,124, filed Jan. 18, 2012, the entire content of each of which is incorporated herein by reference.

TECHNICAL FIELD

This disclosure relates to video coding and, more specifically, video inter-coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode that defines how the predictive block is created and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding significant coefficient information for a video block in a transform skip mode. The transform skip mode may provide a choice of a two-dimensional transform mode, a horizontal one-dimensional transform mode, a vertical one-dimensional transform mode, or a no transform mode. In other cases, the transform skip mode may provide a choice between a two-dimensional transform mode and a no transform mode. The conventional techniques in the current High Efficiency Video Coding (HEVC) working draft (WD) for transform coefficient coding assume a two-dimensional transform. If a transform skip mode is selected in which one or more transforms are skipped for a video block, statistics for the coefficients of the video block will be different than in the two-dimensional transform case. The conventional coding procedures, therefore, may not implement the most efficient procedures to code significant coefficient information for the video block when one or more transforms are skipped for the video block.

The techniques include selecting a transform skip mode for a video block, and coding significant coefficient information for the video block using a coding procedure defined based at least in part on the selected transform skip mode. More specifically, the techniques may include using different coding procedures to efficiently code a position of a last non-zero coefficient within the video block in the transform skip mode. The techniques may also include using different coding procedures to efficiently code a significance map for the video block in the transform skip mode. In addition, the techniques may include one or more of enabling the transform skip mode and coding an indication of the selected transform skip mode based on whether boundaries of the video block are prediction unit boundaries.

In one example, this disclosure is directed to a method for coding video data comprising selecting a transform skip mode for a video block, wherein the transform skip mode comprises a plurality of possible transform modes, applying the selected transform skip mode to the video block, and coding significant coefficient information for the video block using a coding procedure defined based at least in part on the selected transform mode, wherein the significant coefficient information comprises one or more of a position of a last non-zero coefficient and a significance map for the video block.

In another example, this disclosure is directed to a video coding device comprising a memory that stores video data, and a processor configured to select a transform skip mode for a video block, wherein the transform skip mode comprises a plurality of possible transform modes, apply the selected transform skip mode to the video block, and code significant coefficient information for the video block using a coding procedure defined based at least in part on the selected transform skip mode, wherein the significant coefficient information comprises one or more of a position of a last non-zero coefficient and a significance map for the video block.

In another example, this disclosure is directed to a video coding device comprising means for selecting a transform skip mode for a video block, wherein the transform skip mode comprises a plurality of possible transform modes, means for applying the selected transform skip mode to the video block, and means for coding significant coefficient information for the video block using a coding procedure defined based at least in part on the selected transform skip mode, wherein the significant coefficient information comprises one or more of a position of a last non-zero coefficient and a significance map for the video block.

In a further example, a computer-readable medium comprising instructions for coding video data that when executed by a video coding device cause one or more programmable processors to select a transform skip mode for a video block, wherein the transform skip mode comprises a plurality of possible transform modes, apply the selected transform skip mode to the video block, and code significant coefficient information for the video block using a coding procedure defined based at least in part on the selected transform skip mode, wherein the significant coefficient information comprises one or more of a position of a last non-zero coefficient and a significance map for the video block.

DETAILED DESCRIPTION

This disclosure describes techniques for coding significant coefficient information for a video block in a transform skip mode. The transform skip mode may provide a choice of a two-dimensional transform mode, a horizontal one-dimensional transform mode, a vertical one-dimensional transform mode, or a no transform mode. In other cases, the transform skip mode may provide a choice between a two-dimensional transform mode and a no transform mode.

The conventional techniques in the current High Efficiency Video Coding (HEVC) working draft (WD) for transform coefficient coding assume a two-dimensional transform. In the transform skip mode, techniques are provided for transform coefficient coding when transforms in the vertical and horizontal directions are performed or skipped. As described in this disclosure, therefore, the transform skip mode does not require a transform to be skipped, but allows transforms to be performed or skipped based on coding efficiency in the horizontal and vertical directions.

If a transform skip mode is selected in which one or more transforms are skipped for a video block, statistics for the coefficients of the video block will be different than in the two-dimensional transform case. The conventional coding procedures, therefore, may not be the most efficient procedures to code significant coefficient information for the video block.

The techniques include selecting a transform skip mode for a video block, and coding significant coefficient information for the video block using a coding procedure defined based at least in part on the selected transform skip mode. More specifically, the techniques include using different coding procedures to efficiently code a position of a last non-zero coefficient within the video block in the transform skip mode. The techniques also include using different coding procedures to efficiently code a significance map for the video block in the transform skip mode. In addition, the techniques include one or more of enabling the transform skip mode and coding an indication of the selected transform skip mode based on whether boundaries of the video block are prediction unit boundaries.

Figure 1:
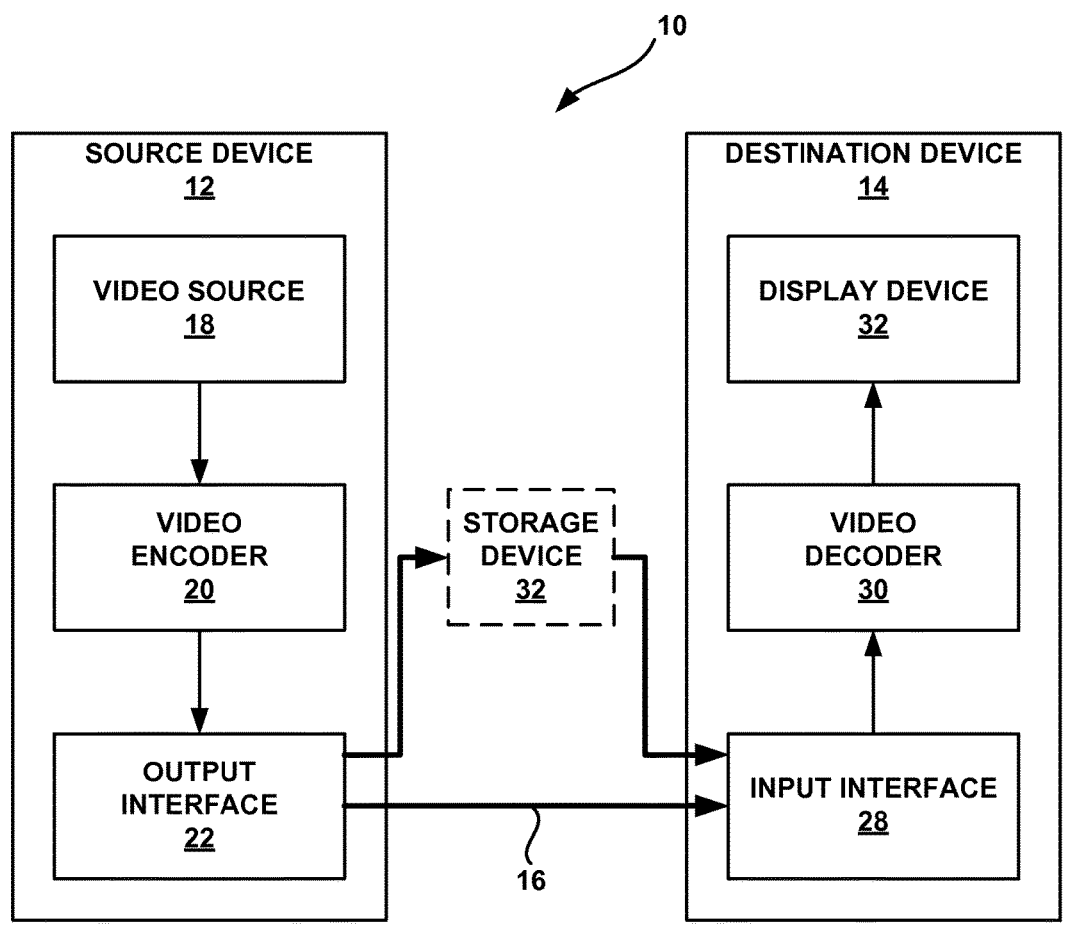
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 12. The encoded video data may be transmitted directly to destination device 14 via output interface 22 of source device 20. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

According to the techniques of this disclosure, video encoder 20 selects a transform skip mode, comprising one of a two-dimensional transform mode, a vertical one-dimensional transform mode, a horizontal one-dimensional transform mode, or a no transform mode, for a video block, and applies the selected transform skip mode to a residual video block. Video encoder 20 encodes significant coefficient information, including at least one of a position of a last non-zero coefficient and significance map, for the video block of transform coefficients using a coding procedure defined based at least in part on the selected transform skip mode. Video encoder 20 also signals an indication of the selected transform skip mode. In some cases, video encoder 20 may enable the transform skip mode and/or encode an indication of the selected transform skip mode based on whether boundaries of the video block are prediction unit boundaries.

Furthermore, according to the techniques of this disclosure, video decoder 30 selects a transform skip mode based on an indication of the selected transform skip mode received from video encoder 20. Video decoder 30 applies an inverse transform corresponding to the selected transform skip mode to reconstruct the residual video block. Video decoder 30 also decodes significant coefficient information, including at least one of a position of a last non-zero coefficient and significance map, for the video block using a coding procedure defined based at least in part on the selected transform skip mode. In some cases, video decoder 30 may infer the transform skip mode and/or decode the indication of the selected transform skip mode based on whether boundaries of the video block are prediction unit boundaries.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down", "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
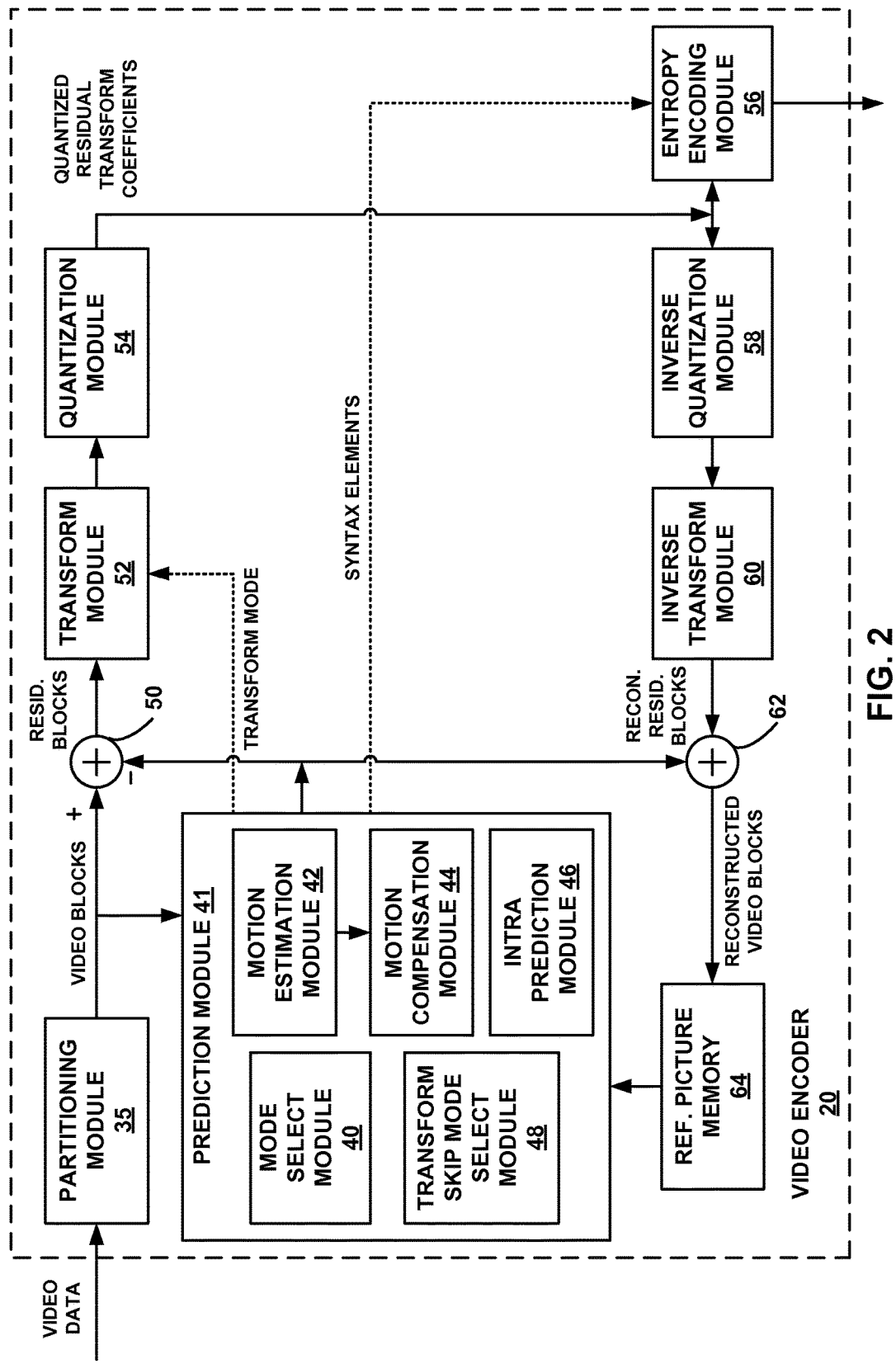
FIG. 2 is a block diagram illustrating an example video encoder that may implement the techniques described in this disclosure to code significant coefficient information for a video block in a transform skip mode.

FIG. 2 is a block diagram illustrating an example video encoder 20 that may implement the techniques described in this disclosure to code significant coefficient information for a video block in a transform skip mode. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning module 35, prediction module 41, reference picture memory 64, summer 50, transform module 52, quantization module 54, and entropy encoding module 56. Prediction module 41 includes mode select module 40, transform skip mode select module 48, motion estimation module 42, motion compensation module 44, and intra prediction module 46. For video block reconstruction, video encoder 20 also includes inverse quantization module 58, inverse transform module 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning module 35 partitions the data into video blocks. This partitioning may also include partitioning into slices, tiles, or other larger units, as well as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles).

Mode select module 40 within prediction module 41 may select one of a plurality of possible coding modes, such as one of a plurality of intra coding modes or one of a plurality of inter coding modes, for the current video block based on error results (e.g., coding rate and the level of distortion). Mode select module 40 may select coding modes at a coding unit (CU) level. When a transform skip mode is enabled for the current video block, a transform skip mode select module 48 within prediction module 41 may select the transform skip mode to be applied to the current video block by transform module 52. Transform skip mode select module 48 may select transform skip modes at a transform unit (TU) level.

In one example, transform skip mode select module 48 may select one of a two-dimensional transform mode, a vertical one-dimensional transform mode, a horizontal one-dimensional transform mode, or a no transform mode. In another example, transform skip mode select module 48 may select between a two-dimensional transform mode and a no transform mode. Mode select module 40 may select the transform skip mode for the current video block based on coding efficiency for the video block. For example, a transform in one or more directions may be skipped for the current video block when applying a two-dimensional transform, such as a discrete cosine transform (DCT), would not provide any gain in coding efficiency.

In some cases, video encoder 20 may enable a transform skip mode for an inter-coded video block or transform unit (TU) based on whether boundaries of the video block comprise prediction unit (PU) boundaries or non-PU boundaries. For example, when the boundaries for a video block in a given direction, e.g., horizontal or vertical, comprise a given combination of PU and non-PU boundaries, e.g., PU-PU, video encoder 20 may enable a transform skip mode. In this case, video encoder 20 may skip application of the transform in the given direction or may signal whether the transform is applied or skipped in the given direction. Otherwise, video encoder 20 may use a boundary dependent transform mode or apply a conventional two-dimensional transform. In other cases, video encoder 20 may use a transform skip mode for the video block, and determine a context used to encode an indication of a selected type of the transform skip mode based on whether boundaries of the video block are PU boundaries or non-PU boundaries.

Intra prediction module 46 within prediction module 41 may perform intra-predictive coding of the current video block relative to one or more neighboring blocks in the same frame or slice as the current block to be coded to provide spatial compression. Motion estimation module 42 and motion compensation module 44 within prediction module 41 perform inter-predictive coding of the current video block relative to one or more predictive blocks in one or more reference pictures to provide temporal compression. Prediction module 41 may provide the resulting intra- or inter-coded block to summer 50 to generate residual block data and to summer 62 to reconstruct the encoded block for use as a reference picture.

Motion estimation module 42 may be configured to determine the inter-prediction mode for a video slice according to a predetermined pattern for a video sequence. The predetermined pattern may designate video slices in the sequence as P slices, B slices or GPB slices. Motion estimation module 42 and motion compensation module 44 may be highly integrated, but are illustrated separately for conceptual purposes. Motion estimation, performed by motion estimation module 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation module 42 may perform a motion search relative to the full pixel positions and fractional pixel positions and output a motion vector with fractional pixel precision.

Motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation module 42 sends the calculated motion vector to entropy encoding module 56 and motion compensation module 44.

Motion compensation, performed by motion compensation module 44, may involve fetching or generating the predictive block based on the motion vector determined by motion estimation, possibly performing interpolations to sub-pixel precision. Upon receiving the motion vector for the PU of the current video block, motion compensation module 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation module 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation module 42 and motion compensation module 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select module 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

In any case, after selecting an intra-prediction mode for a block, intra-prediction module 46 may provide information indicative of the selected intra-prediction mode for the block to entropy coding module 56. Entropy coding module 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 may transform the residual video data into residual transform coefficients using a transform, such as a discrete cosine transform (DCT) or a conceptually similar transform. Transform module 52 may convert the residual video data from a pixel domain to a transform domain, such as a frequency domain.

Conventionally, transform module 52 applies a two-dimensional transform (i.e., in both the horizontal and vertical direction) to the residual data in the TUs. According to the techniques of this disclosure, transform module 52 may instead apply a selected transform skip mode, which may comprise a two-dimensional transform, a horizontal one-dimensional transform, a vertical one-dimensional transform, or no transform, to the residual data in each of the TUs. The different types of transforms provided in the transform skip mode are described in more detail with respect to FIGS. 4A-4D.

Transform module 52 may send the resulting transform coefficients to quantization module 54. Quantization module 54 quantizes the transform coefficients to further reduce bit rate. The quantization process may reduce the bit depth associated with some or all of the coefficients. The degree of quantization may be modified by adjusting a quantization parameter. In some examples, quantization module 54 may then perform a scan of the matrix including the quantized transform coefficients. Alternatively, entropy encoding module 56 may perform the scan.

Following quantization, entropy encoding module 56 entropy encodes the quantized transform coefficients. For example, entropy encoding module 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding module 56, the encoded bitstream may be transmitted to video decoder 30, or archived for later transmission or retrieval by video decoder 30. Entropy encoding module 56 may also entropy encode the motion vectors, and the other syntax elements for the current video slice being coded.

According to the techniques of this disclosure, entropy encoding module 56 encodes significant coefficient information for the block of quantized transform coefficients using a coding procedure defined based at least in part on the selected transform skip mode. For example, the significant coefficient information includes at least one of a position of a last non-zero coefficient within the video block and a significance map for the video block. The coding procedures used to encode the last non-zero coefficient information within the video block in the selected transform skip mode are described in more detail with respect to FIGS. 6A-6C and FIG. 11. The coding procedures used to encode the significance map for the video block in the selected transform skip mode are described in more detail with respect to FIGS. 7A-7C, 8A-8C, FIG. 12 and FIG. 13.

In some cases, entropy encoding module 56 may entropy encode an indication of whether the transform skip mode is enabled for the video block being coded, and, if the transform skip mode is enabled, entropy encoding module 56 may also entropy encode an indication of the selected transform skip mode for the video block. The procedures to enable the transform skip mode and encode the indication of the selected transform skip mode for the video block are described in more detail with respect to FIG. 9, FIG. 13 and FIG. 14.

Inverse quantization module 58 and inverse transform module 60 apply inverse quantization and inverse transformation, respectively, to reconstruct the residual block in the pixel domain for later use as a reference block of a reference picture. Motion compensation module 44 may calculate a reference block by adding the residual block to a predictive block of one of the reference pictures within one of the reference picture lists. Motion compensation module 44 may also apply one or more interpolation filters to the reconstructed residual block to calculate sub-integer pixel values for use in motion estimation. Summer 62 adds the reconstructed residual block to the motion compensated prediction block produced by motion compensation module 44 to produce a reference block for storage in reference picture memory 64. The reference block may be used by motion estimation module 42 and motion compensation module 44 as a reference block to inter-predict a block in a subsequent video frame or picture.

Figure 3:
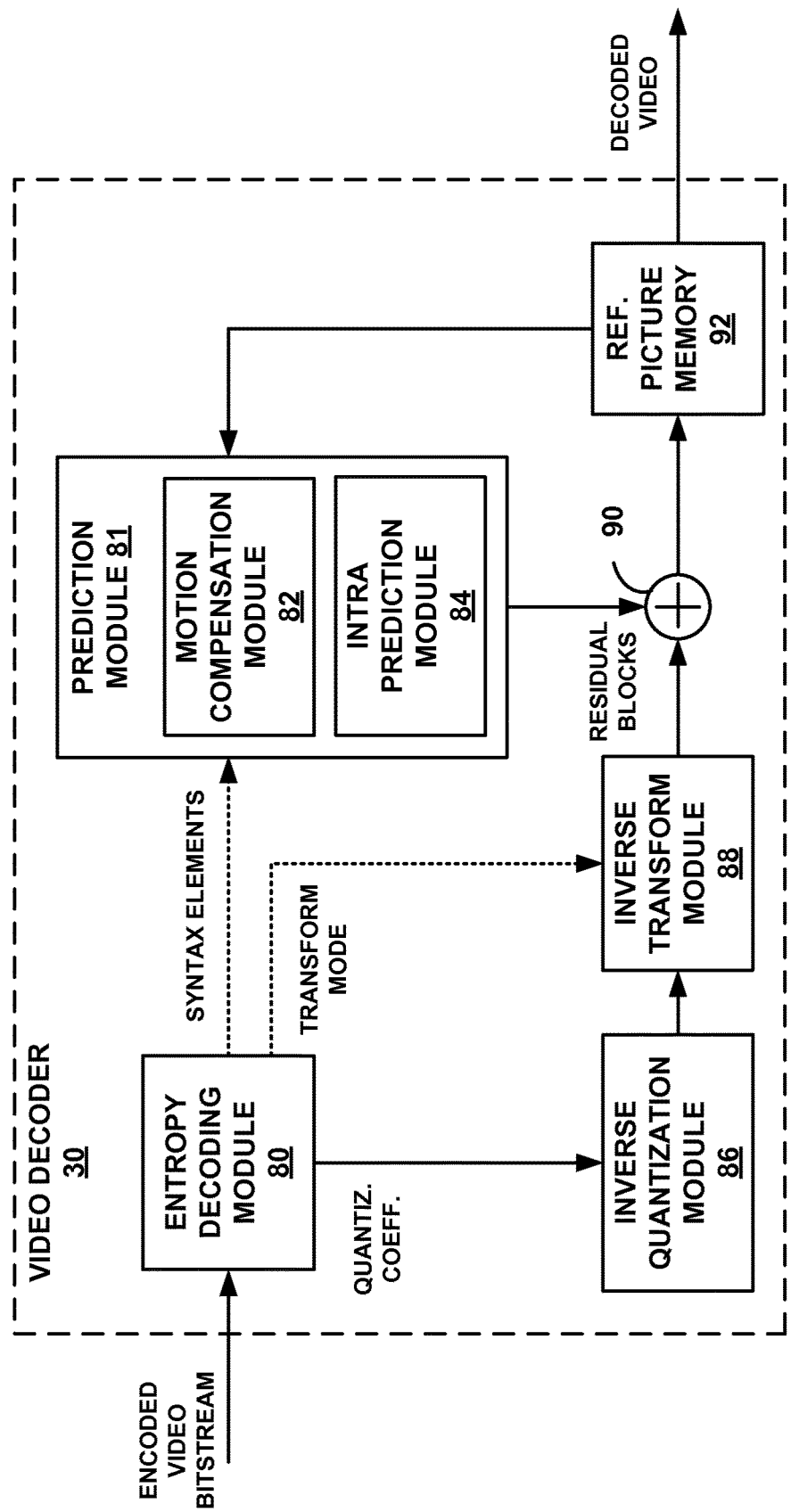
FIG. 3 is a block diagram illustrating an example video decoder that may implement the techniques described in this disclosure to code significant coefficient information for a video block in a transform skip mode.

FIG. 3 is a block diagram illustrating an example video decoder 30 that may implement the techniques described in this disclosure to code significant coefficient information for a video block in a transform skip mode. In the example of FIG. 3, video decoder 30 includes an entropy decoding module 80, prediction module 81, inverse quantization module 86, inverse transformation module 88, summer 90, and reference picture memory 92. Prediction module 81 includes motion compensation module 82 and intra prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding module 80 of video decoder 30 entropy decodes the bitstream to generate quantized coefficients, motion vectors, and other syntax elements. Entropy decoding module 80 forwards the motion vectors and other syntax elements to prediction module 81. Video decoder 30 may receive the syntax elements at the video slice level and/or the video block level.

When a transform skip mode is enabled for a video block to be decoded, entropy decoding module 80 entropy decodes the bitstream to also generate an indication of a selected transform skip mode for the video block. Entropy decoding module 80 then selects the transform skip mode based on the indication of the selected transform skip mode received from video encoder 20. For example, the indication of the selected transform skip mode may indicate one of a two-dimensional transform mode, a vertical one-dimensional transform mode, a horizontal one-dimensional transform mode, or a no transform mode. Entropy decoding module 80 forwards the selected transform skip mode to inverse transform module 88.

In some cases, video decoder 30 may infer a transform skip mode for an inter-coded video block or transform unit (TU) based on whether boundaries of the video block comprise prediction unit (PU) boundaries or non-PU boundaries. For example, when the boundaries for a video block in a given direction, e.g., horizontal or vertical, comprise a given combination of PU and non-PU boundaries, e.g., PU-PU, video decoder 30 may infer a transform skip mode. In this case, video decoder 30 may skip application of the transform in the given direction or may decode an indication of whether the transform is applied or skipped in the given direction. Otherwise, video decoder 30 may use a boundary dependent transform mode or apply a conventional two-dimensional transform. In other cases, video decoder 30 may use a transform skip mode for the video block, and determine a context used to decode the indication of the selected transform skip mode based on whether boundaries of the video block are PU boundaries or non-PU boundaries. The procedures to infer the transform skip mode and decode the indication of the selected transform skip mode for the video block are described in more detail with respect to FIG. 9, FIG. 13 and FIG. 14.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B or P) slice, motion compensation module 82 of prediction module 81 produces predictive blocks for a video block of the current video slice based on the motion vectors and other syntax elements received from entropy decoding module 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation module 82 determines prediction information for a video block of the current video slice by parsing the motion vectors and other syntax elements, and uses the prediction information to produce the predictive blocks for the current video block being decoded. For example, motion compensation module 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation module 82 may also perform interpolation based on interpolation filters. Motion compensation module 82 may use interpolation filters as used by video encoder 20 during encoding of the video blocks to calculate interpolated values for sub-integer pixels of reference blocks. In this case, motion compensation module 82 may determine the interpolation filters used by video encoder 20 from the received syntax elements and use the interpolation filters to produce predictive blocks.

Inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

Conventionally, inverse transform module 88 applies a two-dimensional transform (i.e., in both the horizontal and vertical direction) to the coefficients of the TUs. According to the techniques of this disclosure, inverse transform module 88 may instead apply the selected transform skip mode, which may comprise a two-dimensional transform, a horizontal one-dimensional transform, a vertical one-dimensional transform, or no transform, to the coefficients in each of the TUs. The different types of transforms provided in the transform skip mode are described in more detail with respect to FIGS. 4A-4D.

Entropy decoding module 80 of video decoder 30 decodes significant coefficient information for the current video block using a coding procedure defined based at least in part on the selected transform skip mode. For example, the significant coefficient information includes at least one of a position of a last non-zero coefficient within the video block and a significance map for the video block. The coding procedures used to decode the last non-zero coefficient information within the video block in the selected transform skip mode are described in more detail with respect to FIGS. 6A-6C and FIG. 11. The coding procedures used to decode the significance map for the video block in the selected transform skip mode are described in more detail with respect to FIGS. 7A-7C, 8A-8C, FIG. 12 and FIG. 13.

After motion compensation module 82 generates the predictive block for the current video block based on the motion vectors and other syntax elements, video decoder 30 forms a decoded video block by summing the residual blocks from inverse transform module 88 with the corresponding predictive blocks generated by motion compensation module 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

FIGS. 4A-4D are conceptual diagrams that illustrate examples of blocks of residual video data transformed into coefficients using a two-dimensional transform, a horizontal one-dimensional transform, a vertical one-dimensional transform, and no transform in a transform skip mode. As shown in FIGS. 4A-4D, an 8×8 block of video data, e.g., a TU of a CU, may include sixty-four residual pixel values in corresponding block positions, denoted with circles. For example, blocks 100, 102, 104 and 106 may each have a size of 8×8 and, therefore, include sixty-four residual pixel values generated using prediction techniques previously described.

According to the techniques described in this disclosure, a transform skip mode may be applied to each of blocks 100, 102, 104 and 106. The transform skip mode provides more transform choices instead of always taking a two-dimensional transform of the residual video block. The sixty-four residual pixel values in each of blocks 100, 102, 104 and 106 may be transformed into coefficients using one of a two-dimensional transform, a horizontal one-dimensional transform, a vertical one-dimensional transform, or no transform.

Conventional techniques for transform coefficient coding assume a two-dimensional transform. If a transform skip mode is selected in which one or more transforms are skipped for a video block, statistics for the coefficients of the video block will be different than in the two-dimensional transform case. The conventional coding procedures, therefore, may not be the most efficient procedures to code significant coefficient information for the video block. The techniques of this disclosure describe using different coding procedures to code significant coefficient information, including a position of the last non-zero coefficient within a video block and a significance map for the video block, based at least in part on a selected transform skip mode for the video block.

Figure 4A:
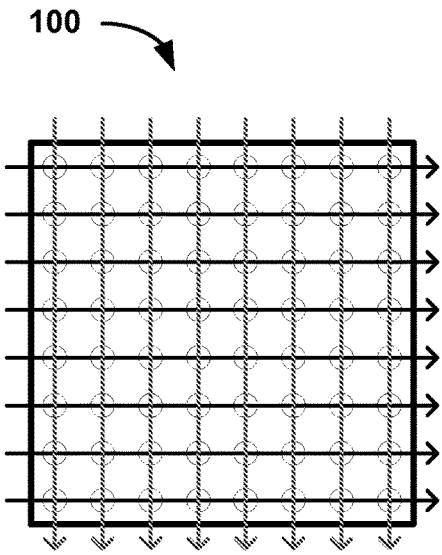
FIGS. 4A-4D are conceptual diagrams that illustrate examples of blocks of residual video data transformed into coefficients using a two-dimensional transform, a horizontal one-dimensional transform, a vertical one-dimensional transform, and no transform in a transform skip mode.
Figure 4B:
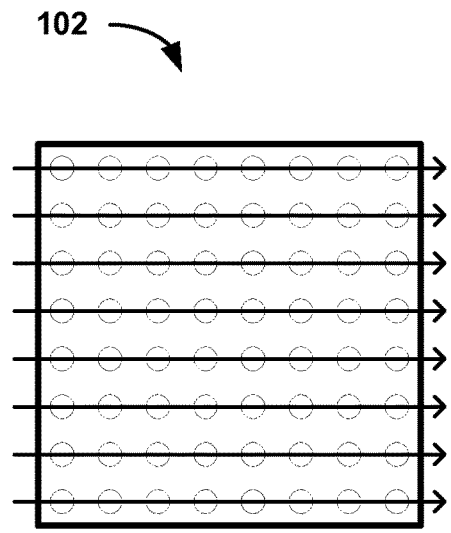

As shown in FIG. 4A, the transform skip mode applied to block 100 is the two-dimensional transform mode. The two-dimensional transform mode transforms the residual pixel values into transform coefficients in both a horizontal direction and a vertical direction, as indicated by the arrows in FIG. 4A. As shown in FIG. 4B, the transform skip mode applied to block 102 is the horizontal one-dimensional transform mode. The horizontal one-dimensional transform mode transforms the residual pixel values into transform coefficients in only a horizontal direction, as indicated by the arrows in FIG. 4B. In this case, a transform in the vertical direction is skipped.

Figure 4C:
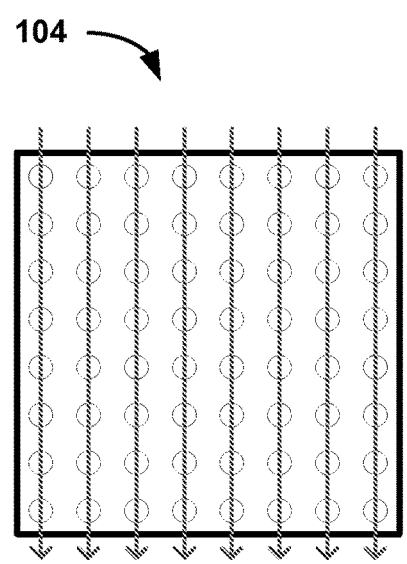
Figure 4D:
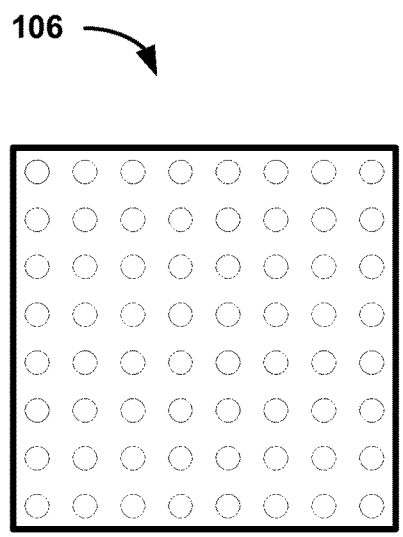

In FIG. 4C, the transform skip mode applied to block 104 is the vertical one-dimensional transform mode. The vertical one-dimensional transform mode transforms the residual pixel values into transform coefficients in only a vertical direction, as indicated by the arrows in FIG. 4C. In this case, a transform in the horizontal direction is skipped. In FIG. 4D, the transform skip mode applied to block 106 is the no transform mode in which no transform is applied to the residual pixel values, as indicated by the absence of arrows in FIG. 4D. In this case, transforms in both the vertical direction and the horizontal direction are skipped. In the no transform mode, the transform coefficients of the video block comprise the residual pixel values.

In other examples, as described above, a block may have a size that is smaller or larger than the size of blocks 100, 102, 104 and 106, and may include more or fewer residual pixel values and corresponding block positions. In these examples, a transform skip mode applied to a particular block may transform the residual pixel values into transform coefficients in a substantially similar manner as shown in blocks 100, 102, 104 and 106 of FIGS. 4A-4D.

FIGS. 5A-5D are conceptual diagrams that illustrate examples of blocks of video data scanned using a zig-zag scanning order, a horizontal scanning order, a vertical scanning order, and a diagonal scanning order. As shown in FIGS. 5A-5D, an 8×8 block of video data, e.g., a TU of a CU, may include sixty-four quantized transform coefficients in corresponding block positions, denoted with circles. For example, blocks 110, 112, 114 and 116 may each have a size of 8×8 and, therefore, include sixty-four quantized transform coefficients generated using a transform skip mode described above with respect to FIGS. 4A-4D. The quantized transform coefficients in each of video blocks 110, 112, 114 and 116 are scanned in preparation for entropy coding using one of the zig-zag scanning order, the horizontal scanning order, the vertical scanning order, and the diagonal scanning order.

Figure 5A:
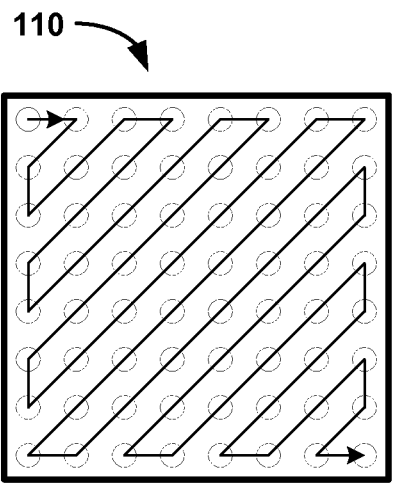
FIGS. 5A-5D are conceptual diagrams that illustrate examples of blocks of video data scanned using a zig-zag scanning order, a horizontal scanning order, a vertical scanning order, and a diagonal scanning order.
Figure 5B:
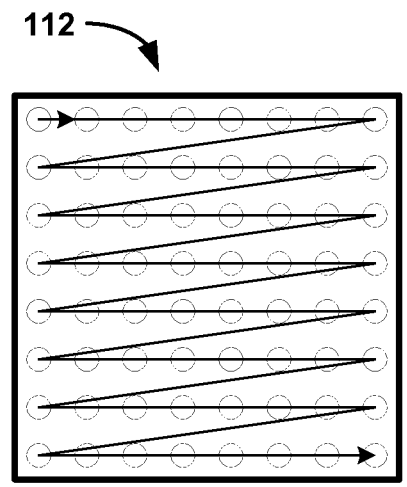
Figure 5C:
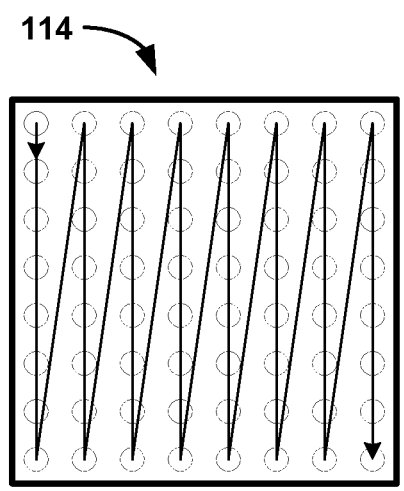
Figure 5D:
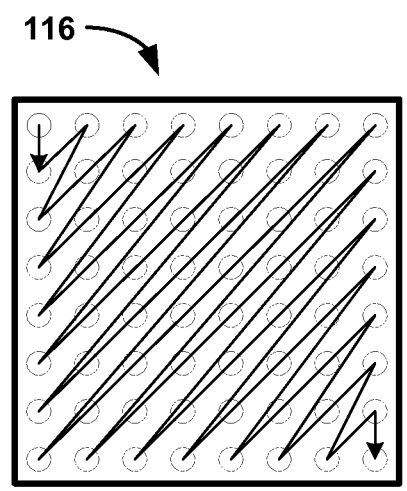

As shown in FIG. 5A, the scanning order associated with block 110 is the zig-zag scanning order. The zig-zag scanning order scans the quantized transform coefficients of block 110 in a diagonal manner as indicated by the arrows in FIG. 5A. Similarly in FIG. 5D, the diagonal scanning order scans the quantized transform coefficients of block 116 in a diagonal manner as indicated by the arrows in FIG. 5D. As shown in FIGS. 5B and 5C, the scanning orders associated with blocks 112 and 114 are the horizontal scanning order and the vertical scanning order, respectively. The horizontal scanning order scans quantized transform coefficients of block 112 in a horizontal line-by-line, or "raster" manner, while the vertical scanning order scans the quantized transform coefficients of block 114 in a vertical line-by-line, or "rotated raster" manner, also as indicated by the arrows in FIGS. 5B and 5C.

In other examples, as described above, a block may have a size that is smaller or larger than the size of blocks 110, 112, 114 and 116, and may include more or fewer quantized transform coefficients and corresponding block positions. In these examples, a scanning order associated with a particular block may scan the quantized transform coefficients of the block in a substantially similar manner as shown in the examples of 8×8 blocks of FIGS. 5A-5D, e.g., a 4×4 block or a 16×16 block may be scanned following any of the scanning orders previously described. A larger block may be divided into smaller sub-blocks and the same scanning order maybe applied to samples within the sub-blocks as well as across the sub-blocks.

In general, any of the scanning orders illustrated in FIGS. 5A-5D may be applied to blocks of quantized transform coefficients generated using any of the transform skip modes illustrated in FIGS. 4A-4D. In one example, however, a zig-zag scanning order illustrated in FIG. 5A or a diagonal scanning order illustrated in FIG. 5D may most often be applied to a video block including coefficients generated using either a two-dimensional transform or no transform in the transform skip mode. In another example, a horizontal scanning order illustrated in FIG. 5B may most often be applied to a video block including coefficients generated using a vertical one-dimensional transform in the transform skip mode. As a further example, a zig-zag scanning order illustrated in FIG. 5A, a vertical scanning order illustrated in FIG. 5C, or a diagonal scanning order illustrated in FIG. 5D may most often be applied to a video block including coefficients generated using a horizontal one-dimensional transform in the transform skip mode.

Figure 6A:
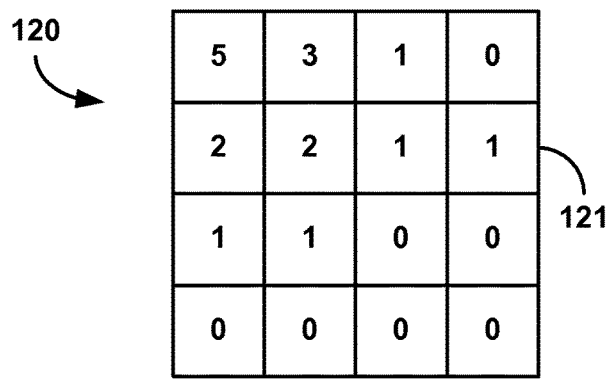
FIGS. 6A-6C are conceptual diagrams that illustrate an example of a block of video data, and corresponding non-zero (i.e., significant) coefficient position information and last non-zero coefficient position information in a transform skip mode.
Figure 6B:
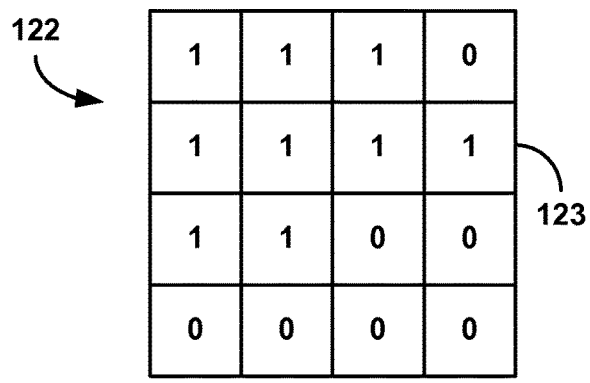
Figure 6C:
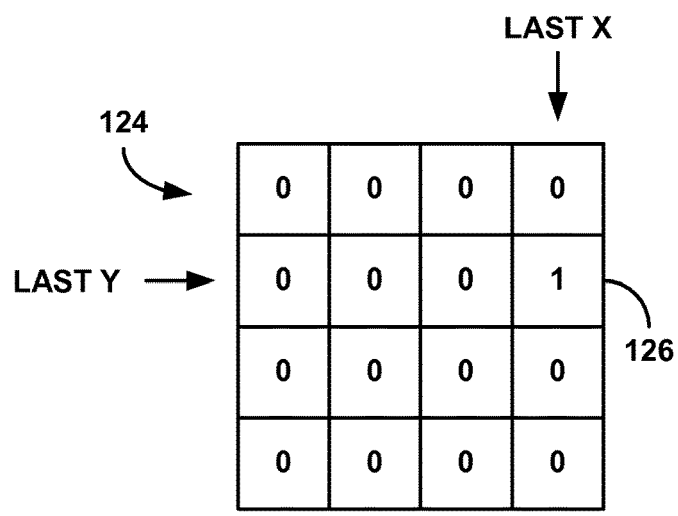

FIGS. 6A-6C are conceptual diagrams that illustrate an example of a block of video data, and corresponding significant coefficient position information (i.e., a significance map) and last non-zero coefficient position information in a transform skip mode. The techniques of this disclosure describe using different coding procedures to code significant coefficient information, including a position of the last non-zero coefficient within a video block and a significance map for the video block, based at least in part on a selected transform skip mode for the video block.

As shown in FIG. 6A, a block of video data, e.g., a TU of a CU, may include quantized transform coefficients of different values or levels. For example, as shown in FIG. 6A, block 120 may include quantized transform coefficients generated using prediction, transform, and quantization techniques previously described. In one example, block 120 has a size of 2N×2N, wherein N equals to two. Accordingly, block 120 has a size of 4×4, and includes sixteen quantized transform coefficients, as also shown in FIG. 6A. In addition, the scanning order associated with block 120 is the zig-zag scanning order, for example, as shown in FIG. 5A described in greater detail above. According to this example, a last significant coefficient within block 120 according to the zig-zag scanning order is a quantized transform coefficient equal to "1," located in position 121 within block 120.

In other examples, a block may have a size that is smaller or larger than the size of block 120, and may include more or fewer quantized transform coefficients than block 120. In still other examples, the scanning order associated with block 120 may be a different scanning order, e.g., a horizontal scanning order, a vertical scanning order, a diagonal scanning order, or another scanning order.

FIG. 6B illustrates an example of significant coefficient position information (i.e., a significance map) represented in block 122. In the example of FIG. 6B, block 122 may correspond to block 120 depicted in FIG. 6A. In other words, significant coefficient flags of block 122 may correspond to the quantized transform coefficients of block 120. As shown in FIG. 6B, the significant coefficient flags of block 122 that are equal to "1" correspond to non-zero or significant coefficients of block 120. Similarly, the significant coefficient flags of block 122 that are equal to "0" correspond to zero or non-significant coefficients of block 120.

In this example, a significant coefficient flag of block 122 corresponding to the last significant coefficient within block 120 according to the zig-zag scanning order is a significant coefficient flag equal to "1," located in position 123 within block 122. In other examples, the values of significant coefficient flags used to indicate significant or non-significant coefficients may vary (e.g., significant coefficient flags equal to "0" may correspond to significant coefficients, and significant coefficient flags equal to "1" may correspond to non-significant coefficients).

FIG. 6C illustrates an example of last non-zero coefficient position information represented in block 124. In the example of FIG. 6C, block 124 may correspond to block 120 and block 122 depicted in FIG. 6A and FIG. 6B, respectively. In other words, a last significant coefficient flag of block 124 may correspond to the quantized transform coefficients of block 120, and to the significant coefficient flags of block 122.

As shown in FIG. 6C, the last significant coefficient flag of block 124 that is equal to "1," located in position 126 within block 124, corresponds to a last non-zero coefficient of block 120, and to a last one of the significant coefficient flags of block 122 that are equal to "1," according to the zig-zag scanning order. Similarly, the last significant coefficient flags of block 124 that are equal to "0" (i.e., all remaining last significant coefficient flags) correspond to zero or non-significant coefficients of block 120, and to all significant coefficient flags of block 122 that are equal to "1" other than the last one of such significant coefficient flags according to the zig-zag scanning order.

The values of the last significant coefficient flags used to indicate a last non-zero coefficient according to a scanning order may vary (e.g., a last significant coefficient flag equal to "0" may correspond to a last non-zero coefficient according to the scanning order, and last significant coefficient flags equal to "1" may correspond to all remaining coefficients). In any case, the significant coefficient flags of block 122, and the last significant coefficient flags of block 124, may be collectively referred to as significant coefficient information for block 120.

In one example, the techniques of this disclosure describe using different coding procedures to code the position of the last non-zero coefficient within a video block based at least in part on a selected transform skip mode for the video block. The transform skip mode may comprise a two-dimensional transform mode, a vertical one-dimensional transform mode, a horizontal one-dimensional transform mode, and a no transform mode, as illustrated in FIGS. 4A-4D. In general, the position of the last non-zero coefficient for the video block depends on the scanning order applied to the video block. The scanning order may comprise a zig-zag scanning order, a horizontal scanning order, a vertical scanning order, and a diagonal scanning order, as illustrated in FIGS. 5A-5D. The position of the last non-zero coefficient for the video block may be explicitly coded prior to coding the significance map for the video block, illustrated in FIG. 6B, and the coefficient level information for the video block, illustrated in FIG. 6A.

As illustrated in FIG. 6C, position 126 of the last non-zero coefficient within block 124 in the zig-zag scan order may be denoted by (lastX, lastY), where lastX denotes the column index for the last non-zero coefficient and lastY denotes the row index for the last non-zero coefficient. When a vertical scan, as illustrated in FIG. 5C, is used, the values of lastX and lastY are swapped for coding purposes. When a two-dimensional transform is applied to a video block to transform residual pixel values into coefficients, lastX and lastY typically have small magnitudes because, after quantization, the non-zero coefficients are concentrated in lower frequencies, i.e., the upper-left corner, of the video block. The signaling of lastX and lastY is designed to take advantage of the typical locations of the non-zero coefficients.

As an example, in the case where a vertical one-dimensional transform mode is selected such that a transform is skipped in the horizontal direction, a horizontal scan, as illustrated in FIG. 5B, may be applied to the video block and higher values of lastX are more probable compared to the two-dimensional transform mode. Instead of coding lastX in a manner similar to the two-dimensional transform mode, the techniques described in this disclosure provide three methods of coding lastX, described in more detail below.

As another example, in the case where a horizontal one-dimensional transform mode is selected such that a transform is skipped in the vertical direction, a vertical scan, as illustrated in FIG. 5C, is applied to the video block and the values of lastX and lastY are swapped such that lastX denotes the row index for the last non-zero coefficient and lastY denotes the column index for the last non-zero coefficient. In this case, again, higher values of lastX are more probable compared to the two-dimensional transform mode. Thus, when a transform is applied in only one direction (horizontal or vertical), lastX is coded using the one of the three methods described below. In these cases, lastY is coded as in the two-dimensional transform mode.

As a further example, in the case where a no transform mode is selected such that transforms are skipped in both the vertical direction and the horizontal direction, higher values are more probable for lastX as well as lastY compared to the two-dimensional transform mode. In this case, both lastX and lastY are coded using one of the three methods described below.

The three methods for coding the position of the last non-zero coefficient within a video block are described in terms of coding lastX. It will be understood that when no transform is applied to residual pixel values of the video block in either the horizontal direction or the vertical direction, the same methods are applied for coding lastY. Although primarily described herein as being applied to square video block, the transform skip mode may be applied to rectangular (i.e., non-square) blocks. In the case, the three methods described below for coding a position of the last non-zero coefficient within a video block may be applied to non-square blocks.

In the first method, lastX is coded using a fixed number of bits, as opposed to using a variable length code. More specifically, a value of lastX may be binarized into a binary bit representation with the fixed number of bits, and then each bit of the binarized index is coded using the bypass mode of CABAC.

The fixed number of bits may be equal to log 2 of the block size. For example, in the case of block 124 from FIG. 6C that comprises a 4×4 block, the fixed number of bits used to code the row index of the last non-zero coefficient may be equal to 2, which is the number of binary bits required to represent column or row index values of 0, 1, 2 and 3. As another example, in the case where a block has a size 16×16, the fixed number of bits may be equal to 4. In other examples, the video block may comprise a rectangular block and the fixed number of bits used to encode lastX may depend on the dimension of the block in the relevant direction. For example, if only the horizontal transform is skipped and a horizontal scan is used, the number of bits used for lastX is equal to log 2 of the block width. If only the vertical transform is skipped and a vertical scan is used, the number of bits used to for lastX is equal to log 2 of the block height due to the swap of lastX and lastY when a vertical scan is used.

When the vertical one-dimensional transform mode is applied to a video block and a horizontal scanning order is applied to the transform coefficients, lastX indicates a column of the last non-zero coefficient within the video block, and lastY indicates a row of the last non-zero coefficient within the video block. In this case, lastX is coded using a fixed number of bits based on a width of the video block, and lastY is coded using a procedure defined for coding a row index for the two-dimensional transform mode.

When the horizontal one-dimensional transform mode is applied to a video block and a vertical scanning order is applied to the transform coefficients, the values of lastX and lastY are swapped such that lastX indicates a row of the last non-zero coefficient within the video block, and lastY indicates a column of the last non-zero coefficient within the video block. In this case, lastX is coded using a fixed number of bits based on a height of the video block, and lastY is coded using a procedure defined for coding a column index for the two-dimensional transform mode.

When the no transform mode is applied to a video block, lastX indicates a column of the last non-zero coefficient within the video block and lastY indicates a row of the last non-zero coefficient within the video block. In this case, lastX and lastY are coded using a fixed number of bits based on a height and a width, respectively, of the video block.

In the second method, instead of coding lastX, B−1−lastX is coded, where B is the block size. The contexts used for coding B−1−lastX may be the same as those used for coding lastX for the two-dimensional transform mode. Alternatively, separate contexts may be used for coding B−1−lastX and coding lastX for the two-dimensional transform mode. This method is particular suited to situations where the last non-zero coefficient in the video block is near the end of the block relative to the scanning order. Since the position of lastX is subtracted from the block size, a small value will result when the position of lastX is at a column closest to the right side of the block, or at a row closest to the bottom of the block in the case of a vertical scan.

When the vertical one-dimensional transform mode is applied to a video block and a horizontal scanning order is applied to the transform coefficients, lastX indicates a column of the last non-zero coefficient within the video block, and lastY indicates a row of the last non-zero coefficient within the video block. In this case, lastX is coded using $B_h-1-lastX$, wherein $B_h$ is the horizontal block size, i.e., width of the video block, and lastY is coded using a procedure defined for coding the row index for the two-dimensional transform mode.

When the horizontal one-dimensional transform mode is applied to a video block and a vertical scanning order is applied to the transform coefficients, the values of lastX and lastY are swapped such that lastX indicates a row of the last non-zero coefficient within the video block, and lastY indicates a column of the last non-zero coefficient within the video block. In this case, lastX is coded using $B_v-1-lastX$, wherein $B_v$ is the vertical block size, i.e., height of the video block, and lastY is coded using a procedure defined for coding the column index for the two-dimensional transform mode.

When the no transform mode is applied to a video block, lastX indicates a column of the last non-zero coefficient within the video block and lastY indicates a row of the last non-zero coefficient within the video block. In this case, lastX and lastY are coded using $B_h-1-lastX$ and $B_v1-lastX$, respectively, wherein $B_h$ is the horizontal block size and $B_v$ the vertical block size, respectively.

The third method is described separately for type of transform skip mode. In a first example, when the vertical one-dimensional transform mode is applied to the video block, i.e., the horizontal transform is skipped, and a horizontal scanning order is applied to the transform coefficients, coding of lastX is skipped and lastY is coded as in the two-dimensional transform mode. In this case, the horizontal scanning order, as illustrated in FIG. 5B, is used to scan the vertically transformed coefficients. Since LastY is coded, video decoder 30 knows the index of the row corresponding to the last non-zero coefficient. The index of the column corresponding to the last non-zero coefficient is unknown, however, because the techniques of skipping the coding of lastX.

Conventionally, in the two-dimensional transform case, the significance for the last non-zero coefficient is not coded since it can be inferred that the last non-zero coefficient is significant. When the index of the column corresponding to the last significant coefficient is unknown, the significance of the last non-zero coefficient can no longer be assumed. According to the techniques of this disclosure, a significance map for all coefficients within the row indicated by lastY is coded and sent to video decoder 30. The significance map identifies the position of each non-zero coefficient within the indicated row of the video block such that the position of the last non-zero coefficient in the indicated row relative to the horizontal scanning order will be the last non-zero coefficient within the video block.

When the horizontal one-dimensional transform mode is applied to the video block, i.e., the vertical transform is skipped, and the vertical scanning order is applied to the transform coefficients, coding of lastX is again skipped and lastY is coded as in the two-dimensional transform mode. Recall that in this case, lastX and lastY values are swapped such that lastX indicates the row index for the last non-zero coefficient and lastY indicates the column index for the last non-zero coefficient. In this case, the vertical scanning order, as illustrated in FIG. 5C, is used to scan the horizontally transformed coefficients. Since LastY is coded, video decoder 30 knows the index of the column corresponding to the last non-zero coefficient. The index of the row corresponding to the last non-zero coefficient is unknown, however, because the techniques skip the coding of lastX. In this case, according to the techniques of this disclosure, a significance map for all coefficients within the column indicated by lastY is coded and sent to video decoder 30. The significance map identifies the position of each non-zero coefficient within the indicated column of the video block such that the position of the last non-zero coefficient in the indicated column relative to the vertical scanning order will be the last non-zero coefficient within the video block.

When the no transform mode is applied to the video block, i.e., no transform is applied in either the horizontal or vertical direction, the coding of lastX as well as lastY is skipped. In this case, a significance map for all coefficients within the video block, including the last non-zero coefficient, is coded and sent to video decoder 30. The significance map identifies the position of each non-zero coefficient within the video block such that the position of the last non-zero coefficient in the video relative to the scanning order will be the last non-zero coefficient within the video block.

The first, second and third methods described above are based on the assumption that a vertical scan is used when only the vertical transform is skipped, and a horizontal scan is used when only the horizontal transform is skipped. In some examples, however, a zig-zag or diagonal scan, illustrated by FIGS. 5A and 5D respectively, may be used when only a vertical transform or only a horizontal transform is skipped. In this case, no swap of lastX and lastY occurs.

In addition, the methods are primarily described above with respect to square blocks, but the method may also be applied to rectangular (i.e., non-square) blocks instead of square blocks. In either case, the methods described above for coding the position of the last non-zero coefficient within a block may be modified appropriately to take the width and height of the block into account.

In some examples, the position of the last non-zero coefficient within a video block is encoded in two steps. In the first step, an index to an interval, e.g., a row or column of the video block, to which the position of the last non-zero coefficient belongs, is context-coded. In the second step, the position of the last non-zero coefficient within the interval is bypass coded. In order to group bypass-coded bins together, the context-coded bins for lastX and lastY are encoded first. This is followed by the bypass bins for lastX and lastY.

For the first method described above in which lastX is coded using a fixed number of bits, when only the horizontal transform is skipped, or when only the vertical transform is skipped and the scan is vertical, the order in which the binary bits (i.e., bins) of lastX and lastY are coded is as follows (assuming lastX is coded followed by lastY): (1) Bypass-coded fixed number of bins for lastX, (2) Context-coded bins for lastY, and (3) Bypass-coded bins for lastY. In the above case, the bypass coded bins are split. To avoid this, when only the horizontal transform is skipped, or when only the vertical transform is skipped and the scan is vertical, the order in which the bins are coded may be modified as follows: (1) Context-coded bins for lastY, (2) Bypass-coded bins for lastY, and (3) Bypass-coded fixed number of bins for lastX. In this way, the bypass coded bins are grouped together. Video decoder 30 then decodes the data in the same order.

According to the techniques of this disclosure, the binary bits representing a position of a last non-zero coefficient within a video block may be coded in a specific order based on the selected transform skip mode. For example, in the two-dimensional transform mode, the order in which the bins are coded is as follows: (1) Context-coded bins for lastX, (2) Context-coded bins for lastY, (3) Bypass coded bins for lastX, and (4) Bypass coded bins for lastY. In the case where only the horizontal transform is skipped, or only the vertical transform is skipped and a vertical scan is used, the order in which the bins are coded is as follows: (1) Context-coded bins for lastY, (2) Bypass-coded bins for lastY, and (3) Bypass-coded fixed number of bins for lastX.

In the case where only the vertical transform is skipped and a non-vertical scan is used such that no swap of lastX and lastY occurs, the order in which the bins are coded is as follows: (1) Context-coded bins for lastX, (2) Bypass-coded bins for lastX, and (3) Bypass-coded fixed number of bins for lastY. In the case where both the horizontal and vertical transforms are skipped, the order in which the bins are coded is as follows: (1) Bypass-coded fixed number of bins for lastX, and (2) Bypass-coded fixed number of bins for lastY.

Figure 7A:
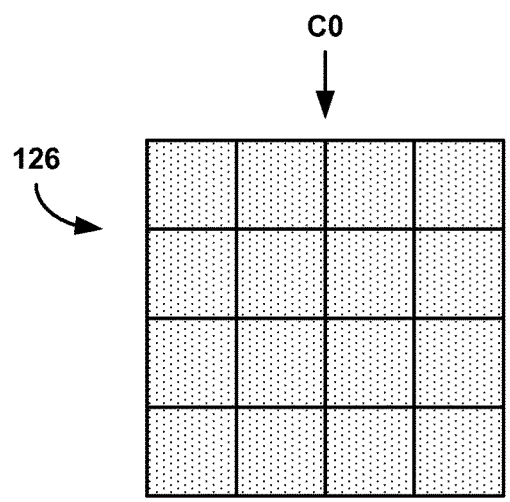
FIGS. 7A-7C are conceptual diagrams that illustrate examples of blocks of video data and significance map contexts shared for the block, each column of the block, and each row of the block in a transform skip mode.
Figure 7B:
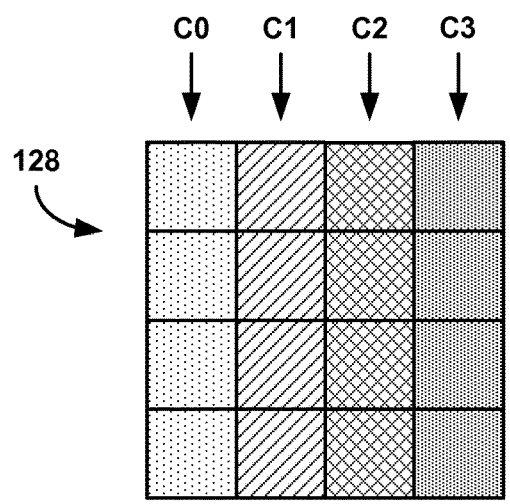
Figure 7C:
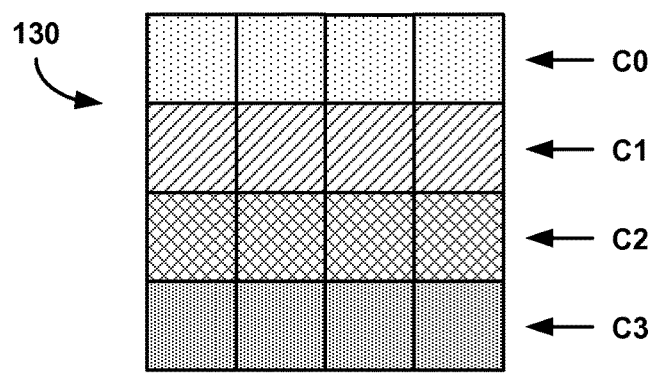

FIGS. 7A-7C are conceptual diagrams that illustrate examples of blocks of video data and significance map contexts shared for the block, each column of the block, and each row of the block in a transform skip mode. The techniques of this disclosure describe using different coding procedures to code significant coefficient information, including a significance map for the video block, based at least in part on a selected transform skip mode for the video block. The transform skip mode may comprise a two-dimensional transform mode, a vertical one-dimensional transform mode, a horizontal one-dimensional transform mode, and a no transform mode, as illustrated in FIGS. 4A-4D.

Conventionally, after coding the position of the last non-zero coefficient in the scan order for the video block, a significance map is coded for the video block to identify the position of each non-zero coefficient, except the last non-zero coefficient, within the video block. For 16×16 and 32×32 blocks, a causal (in the reverse scan order) neighborhood of five coefficients may be used to determine the context for coding the significance map for a given coefficient. Instead of a causal neighborhood, the coded sub-block flags for the right and bottom 4×4 sub-blocks neighboring the current video block may also be used to determine the context for coding the significance map. The rationale behind these coding techniques is that when significant coefficients exist in the neighborhood, the probability increases that the given coefficient is significant.

For 4×4 and 8×8 blocks, different contexts are used. In particular, for 4×4 blocks a separate context may be used for every coefficient position. Thus, 4×4 blocks may use a total of 30 contexts (i.e., 15 for luma and 15 for chroma). Similarly, for 8×8 blocks, the contexts may be position dependent with each 2×2 sub-block of an 8×8 block sharing a context. Thus, 8×8 blocks may use 32 contexts (i.e., 16 for luma and 16 for chroma).

When a transform is skipped in one or both directions, however, the position based contexts may not achieve good coding efficiency. For example, if the vertical transform is skipped, the statistics of transform coefficients in one column may be very similar, but the statistics of transform coefficients may vary from one column to another column due to the application of only the horizontal transform. Similarly, when no transform is applied to a video block, all the coefficients within the block may have similar statistics.

One example of the techniques of this disclosure may use the following processes to code a significance map for a video block. For 16×16 and 32×32 blocks, contexts for the significance map may be shared between blocks with different types of transform skip modes. For example, the blocks for which a two-dimensional transform mode is applied may share contexts with blocks for which a vertical one-dimensional transform mode, a horizontal one-dimensional transform mode, or a no transform mode is applied, i.e., a transform is skipped in at least one direction. For the 4×4 and 8×8 blocks, contexts for the significance map may be shared between coefficients in the video block, within each column of the video block or within each row of the video block when one or more transforms are skipped for the video block. When a two-dimensional transform mode is applied to the video block, the typical contexts defined as described above may be used.

FIG. 7A illustrates a video block 126 of video data, or a TU of a CU, with a single context, C0, shared for all coefficient positions within the block. As illustrated in FIG. 7A, block 126 comprises a 4×4 block with 16 coefficient positions. In other examples, block 126 may comprise a larger block, e.g., an 8×8 block, with more coefficient positions or a rectangular (i.e., non-square) block. When no transform is applied in either the horizontal or vertical direction of block 126, all the coefficients within block 126 may use a single context, i.e., C0. In this case, when no transform is applied, there are two additional contexts for 4×4 blocks (i.e., 1 for luma and 1 for chroma). Similarly, in the case of an 8×8 block, all the coefficients may use a single context when no transform is applied. In this case, there are also two additional contexts for 8×8 blocks (i.e., 1 for luma and 1 for chroma).

FIG. 7B illustrates a video block 128 of video data, or a TU of a CU, with shared contexts for coefficients within each column of the video block. In the example illustrated in FIG. 7B, the first column is assigned context C0, the second column is assigned context C1, the third column is assigned context C2, and the fourth column is assigned context C3. As illustrated in FIG. 7B, block 128 comprises a 4×4 block with 16 coefficient positions. In other examples, block 128 may comprise a larger block, e.g., an 8×8 block, with more coefficient positions or a rectangular (i.e., non-square) block. When a transform in the vertical direction is skipped for block 128, all the coefficients in a column of block 128 may share a single context. In this case, when a horizontal one-dimensional transform is applied, there are eight additional contexts for a 4×4 block (i.e., 4 for luma and 4 for chroma). Similarly, in the case of an 8×8 block, there are sixteen additional contexts (i.e., 8 for luma and 8 for chroma).

FIG. 7C illustrates a video block 130 of video data, or a TU of a CU, with shared contexts for coefficients within each row of the video block. In the example illustrated in FIG. 7C, the first row is assigned context C0, the second row is assigned context C1, the third row is assigned context C2, and the fourth row is assigned context C3. As illustrated in FIG. 7C, block 130 comprises a 4×4 block with 16 coefficient positions. In other examples, block 130 may comprise a larger block, e.g., an 8×8 block, with more coefficient positions or a rectangular (i.e., non-square) block. When a transform in the horizontal direction is skipped, all the coefficients in a row may share a single context. In this case, when a vertical one-dimensional transform is applied, there are there are eight additional contexts for a 4×4 block (i.e., 4 for luma and 4 for chroma). Similarly, in the case of an 8×8 block, there are sixteen additional contexts (i.e., 8 for luma and 8 for chroma).

In some examples, instead of using additional contexts for each row of the video block, the contexts may be shared between the rows when a transform is skipped in the horizontal direction and the columns when a transform is skipped in the vertical direction. The shared contexts when a horizontal transform is skipped and when a vertical transform is skipped may mirror one another such that the first column when the horizontal transform is skipped has similar contexts to the first row when the vertical transform is skipped).

In one example consistent with the points above, a total of 2+2+8+16 additional contexts may be used. In other examples, many variations are possible based on the basic scheme outlined herein. For example, chroma significance flags may be coded using conventionally determined contexts while luma significance flags are coded using the method described above. Alternatively, the contexts used for 4×4 and 8×8 blocks when a transform is skipped in at least one direction may be extended to 16×16 and 32×32 blocks. Also for 8×8 blocks, when a transform is skipped in one direction, the neighboring two columns (if a vertical transform is skipped) or the neighboring two rows (if the horizontal transform is skipped) may share contexts.

Figure 8A:
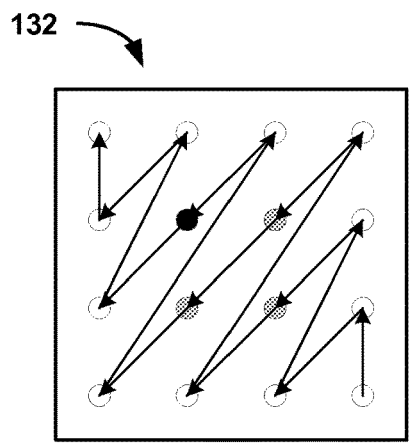
FIGS. 8A-8C are conceptual diagrams that illustrate examples of blocks of video data and significance map context neighborhoods of coefficients used for a diagonal scanning order, a vertical scanning order, and a horizontal scanning order in a transform skip mode.
Figure 8B:
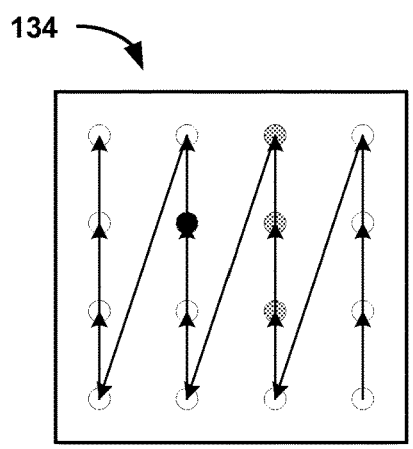
Figure 8C:
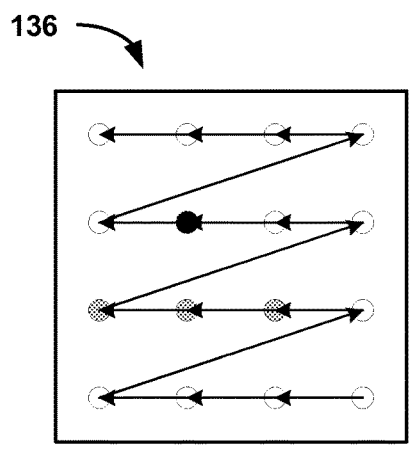

FIGS. 8A-8C are conceptual diagrams that illustrate examples of blocks of video data and significance map context neighborhoods of coefficients used for a diagonal scanning order, a vertical scanning order, and a horizontal scanning order in a transform skip mode. The techniques of this disclosure describe using different coding procedures to code significant coefficient information, including a significance map for the video block, based at least in part on a selected transform skip mode for the video block. As shown in FIGS. 8A-8C, a 4×4 block of video data may include sixteen quantized transform coefficients in corresponding block positions, denoted with circles. For example, blocks 132, 134 and 136 may each have a size of 4×4 and, therefore, include sixty-four quantized transform coefficients generated using a transform skip mode. In other examples, blocks 132, 134 and 136 may comprise larger blocks, e.g., an 8×8 block, with more quantized transform coefficients or rectangular (i.e., non-square) blocks.

For a video block for which a two-dimensional transform mode is applied, the significant coefficients are usually concentrated in the top left (i.e., lower frequency) region of the block. When no transform is applied to the video block, the significant coefficients can be spread out throughout the block. Even in that case, however, the significant coefficients tend to be spatially clustered. Having significant coefficients in the neighborhood, therefore, can increase the probability that a current coefficient is significant. In this disclosure, when no transform is applied to a video block, the terms "coefficients" and "transform coefficients" is used to refer to residual pixel values.

To take advantage of clustering of significant coefficients, a causal (in the reverse scan order) neighborhood of coefficients may be used to determine the context for 4×4 and 8×8 blocks in the no transform skip mode. Since 4×4 and 8×8 blocks may be scanned vertically, horizontally or in a diagonal direction, three different context neighborhoods may be used depending on the scan. The context neighborhoods may be chosen for a given coefficient within the video block so that a context neighborhood does not include coefficients in the same scan line as the given coefficient. In other examples, the context neighborhoods may include more or fewer than three coefficients. Furthermore, although primarily described herein for the no transform skip mode, the causal neighborhood of coefficients may be used to determine context for blocks in which a transform is skipped in only one direction. In other cases, instead of a causal neighborhood, causal coded sub-block flags may be used for determining the context.

FIG. 8A illustrates a video block 132 of video data, or a TU of a CU, with a context neighborhood of coefficients defined based on a reverse diagonal scanning order, as indicated by the arrows in FIG. 8A. A current coefficient of video block 132 is denoted with a black circle, and the coefficients in the context neighborhood for the current coefficient are denoted by shaded gray circles. As illustrated in FIG. 8A, for a diagonal scanning order, the context neighborhood of coefficients does not include coefficients in the same diagonal scan line as the current coefficient. In this example, a significance map may be coded for the current coefficient using the context determined by the context neighborhood defined for the diagonal scanning order, as illustrated in FIG. 8A. In this way, context processing may be performed in parallel for all the coefficients along the same diagonal as the current coefficient.

FIG. 8B illustrates a video block 134 of video data, or a TU of a CU, with a context neighborhood of coefficients defined based on a reverse vertical scanning order, as indicated by the arrows in FIG. 8B. A current coefficient of video block 134 is denoted with a black circle, and the coefficients in the context neighborhood for the current coefficient are denoted by shaded gray circles. As illustrated in FIG. 8B, for a vertical scanning order, the context neighborhood of coefficients does not include coefficients in the same column scan line as the current coefficient. In this example, a significance map may be coded for the current coefficient using the context determined by the context neighborhood defined for the horizontal scanning order, as illustrated in FIG. 8B. In this way, context processing may be performed in parallel for all the coefficients in the same column as the current coefficient.

FIG. 8C illustrates a video block 136 of video data, or a TU of a CU, with a context neighborhood of coefficients defined based on a reverse horizontal scanning order, as indicated by the arrows in FIG. 8C. A current coefficient of video block 136 is denoted with a black circle, and the coefficients in the context neighborhood for the current coefficient are denoted by shaded gray circles. As illustrated in FIG. 8C, for a horizontal scanning order, the context neighborhood of coefficients does not include coefficients in the same row scan line as the current coefficient. In this example, a significance map may be coded for the current coefficient using the context determined by the context neighborhood defined for the vertical scanning order, as illustrated in FIG. 8A. In this way, context processing may be performed in parallel for all the coefficients in the same row as the current coefficient.

In some examples, even if a context neighborhood can be defined with three coefficients, it may be possible to use more or fewer coefficients in the neighborhood, as long as no coefficients on a current scan line are included in the context neighborhood. If parallel context processing is not a concern, however, any coefficients for which significance information has already been coded may be included in the neighborhood.

In one example, let $(i, j)$ denote a transform coefficient in the $i^{th}$ row and $j^{th}$ column. It should be noted that for coding significance flags, a backward scan may be used. For different scans, the context neighborhood that is used for a given coefficient may be defined as follows. For a vertical scan: The context neighborhood may contain coefficients $(i-1, j+1)$, $(i, j+1)$ and $(i+1, j+1)$. For a horizontal scan: The context neighborhood may contain coefficients $(i+1, j-1)$, $(i+1, j)$ and $(i+1, j+1)$. For a diagonal scan: The context neighborhood may contain coefficients $(i, j+1)$, $(i+1, j)$ and $(i+1, j+1)$.

When a coefficient included in the context neighborhood is beyond the block boundary, this coefficient may be assumed to be not significant. Although the context neighborhoods defined above have been described assuming a backward scan, forward scans may also be used. Moreover, if a forward scan is used, the context neighborhoods can be adjusted appropriately. For example, the context neighborhood for a vertical scan may be $(i-1, j-1)$, $(i, j-1)$ and $(i+1, j-1)$. Furthermore, similar changes can be made for horizontal and diagonal scans.

In some examples, the binary number representation of the significance map for the context neighborhood may be used as a context number. In this case, a neighborhood containing three coefficients may result in eight contexts. Alternatively, the number of significant coefficients in the context neighborhood may be used to determine the context, in which case the number of resulting contexts may be four. The contexts for different scans and block sizes may be shared in some cases, or separate contexts may be used depending on the block size and scan.

Figure 9:
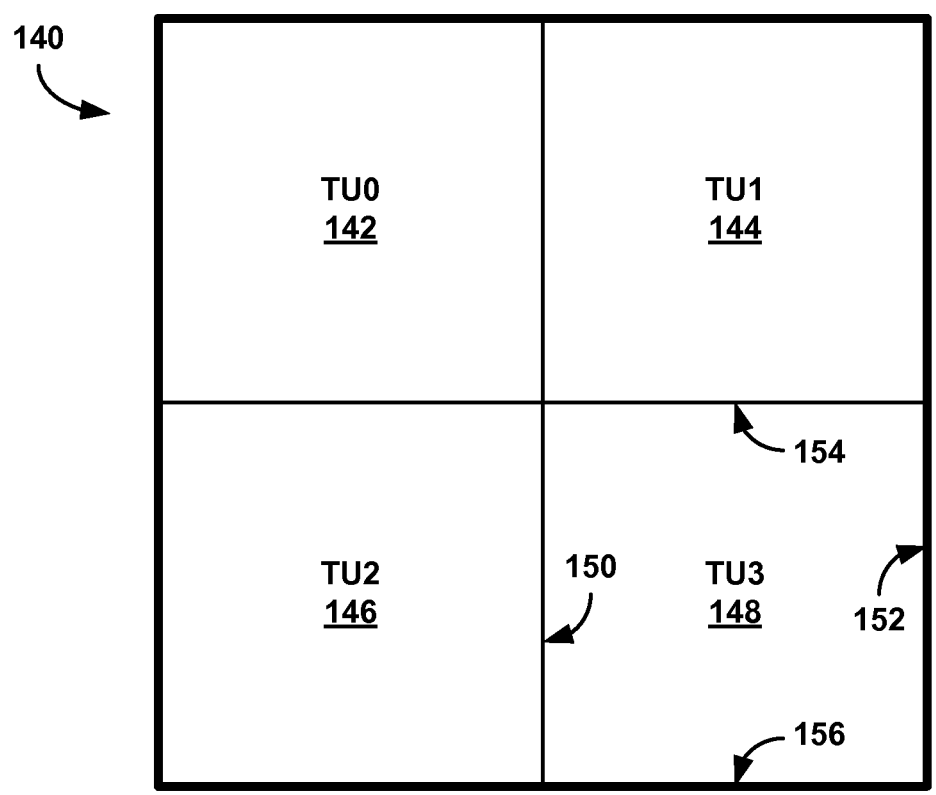
FIG. 9 is a conceptual diagram that illustrates an example of blocks of video data within a prediction unit and boundaries of the blocks used to determine whether to enable a transform skip mode or code an indication of a selected transform skip mode.

FIG. 9 is a conceptual diagram that illustrates an example of blocks of video data within a prediction unit and boundaries of the blocks used to determine whether to enable a transform skip mode or code an indication of a selected transform skip mode. As illustrated in FIG. 9, blocks of video data, or TUs, 142, 144, 146 and 148 are defined within PU 140. Each of the TUs has four edges that may comprise a PU boundary or a non-PU boundary. For example, TU3 148 includes a left edge 150 that is a non-PU boundary, a right edge 152 that is a PU boundary, a top edge 154 that is a non-PU boundary, and a bottom edge 156 that is a PU boundary.

Conventionally, a type of transform skip mode to be applied to a given video block is selected by performing an exhaustive search to determine which transform type provides the most data compression for the video block. This exhaustive search may lead to increased run-times a video encoder 20. In addition, sending an indication of the selected transform skip mode for each video block may be costly in terms of bit consumption.

In some cases, a boundary dependent transform mode may be used for a video block to apply different types of two-dimensional transforms to the video block based on whether the boundaries of the video block or TU are PU or non-PU boundaries. In this transform mode, instead of always applying a 2D-DCT, each boundary of the video block is determined to be either a non-PU boundary or a PU boundary, and the horizontal and vertical transforms shown in Tables 1 and 2, below, are applied to the video block.

The basic idea behind the boundary dependent transform mode is that the prediction residual energy is typically high at a PU boundary and low at a non-PU boundary. According to Tables 1 and 2, below, when the left side is a non-PU boundary and the right side is a PU boundary, as for TU3 148 in FIG. 9, a DST Type VII or DCT Type IV horizontal transform is used. If the left side is a PU boundary and the right side is a non-PU boundary, a DST Type VII or DCT Type IV horizontal transform is performed on the flipped row. When the left and right boundaries are of the same type (e.g., PU-PU or non-PU-on-PU), a DCT Type II is used in the horizontal direction. The same strategy is followed in the vertical direction. It should be noted that instead of DST Type VII or DCT Type IV, any other transform whose first basis function is monotonically increasing could be used.

TABLE 1

Mapping from Boundary Type to Transform using DST-VII (4-pt)

| TU Boundary | | Horizontal | TU Boundary | | Vertical |
|---|---|---|---|---|---|
| Left | Right | Trans. | Top | Bottom | Trans. |
| non-PU | PU | DST-VII | non-PU | PU | DST-VII |
| PU | non-PU | F(DST-VII) | PU | non-PU | F(DST-VII) |
| PU | PU | DCT-II | PU | PU | DCT-II |
| non-PU | non-PU | DCT-II | non-PU | non-PU | DCT-II |

TABLE 2

Mapping from Boundary Type to Transform using DCT-IV (8-pt & 16-pt)

| TU Boundary | | Horizontal | TU Boundary | | Vertical |
|---|---|---|---|---|---|
| Left | Right | Trans. | Top | Bottom | Trans. |
| non-PU | PU | F(DCT-IV) | non-PU | PU | F(DCT-IV) |
| PU | non-PU | DCT-IV | PU | non-PU | DCT-IV |
| PU | PU | DCT-II | PU | PU | DCT-II |
| non-PU | non-PU | DCT-II | non-PU | non-PU | DCT-II |

The techniques of this disclosure may include selectively combining the boundary dependent transform mode and the transform skip mode using the following three methods.

In a first method, boundaries of a video block in a given direction are determined to be PU boundaries or non-PU boundaries, the transform skip mode is then enabled for the video block based at least in part on the determined boundaries of the video block in the given direction, and the transform in the given direction is skipped. As one example, whenever the sides of a TU are non-PU-non-PU, non-PU-PU or PU-non-PU in a given direction, the boundary dependent transform mode is applied to the TU in the given direction. When the sides of a TU are PU-PU in a given direction, the transform skip mode is enabled for the block and a transform in the given direction is skipped. This example is shown in Table 3, below.

According to this method, the selected transform skip mode is not signaled to video decoder 30. Instead, the determination of whether to skip a transform for the video block in a given direction is boundary-dependent. An indication of whether a transform is skipped is, therefore, not explicitly signaled to video decoder 30, but is derived based on the determined boundaries of the video block. The choice of whether a transform is skipped is independent in the horizontal and vertical directions.

TABLE 3

Mapping from Boundary Type to Transform for Combination of Transform Skip Mode and Boundary Dependent Transform Mode

| TU Boundary | | Horizontal | TU Boundary | | Vertical |
|---|---|---|---|---|---|
| Left | Right | Trans. | Top | Bottom | Trans. |
| non-PU | PU | F(DCT-IV/DST-VII) | non-PU | PU | F(DCT-IV/DST-VII) |
| PU | non-PU | DCT-IV/DST-VII | PU | non-PU | DCT-IV/DST-VII |
| PU | PU | Transform - skip | PU | PU | Transform - skip |
| non-PU | non-PU | DCT-II | non-PU | non-PU | DCT-II |

In a second method, boundaries of a video block in a given direction are determined to be PU boundaries or non-PU boundaries, the transform skip mode is then enabled for the video block based at least in part on the determined boundaries of the video block in the given direction, and an indication of whether the transform in the given direction is skipped is signaled to video decoder 30. In this case, the transform skip mode is enabled and explicitly signaled only for certain combinations of TU boundaries.

As an example, consider that transform skip mode is possible only when the TU boundary combination is PU-PU in a given direction. In that case, for the other three boundary combinations, namely, non-PU-PU, PU-non-PU, and non-PU-non-PU, a transform cannot be skipped in the given direction. When the TU boundary combination is PU-PU, one bit is signaled to indicate whether the transform is performed or skipped for the video block in the given direction. In other examples, the transform skip mode may be enabled and explicitly signaled for other combinations of TU boundaries. For example, in an alternative example, the selected transform skip mode may be signaled when the TU boundary combination for a video block is PU-PU or non-PU-non-PU.

In a third method, the transform skip mode is enabled for a video block, boundaries of the video block in a given direction are determined to be PU boundaries or non-PU boundaries, and an indication of whether the transform in the given direction is skipped is coded using a context defined based at least in part on the determined boundaries of the video block in the given direction. For each of horizontal and vertical directions, one bin is sent to indicate whether a transform in the given direction is performed or skipped. Each bin is arithmetically coded using a context chosen based on the determined boundary combination of the video block in that direction.

As one example, four different contexts may be used to code a bin used to indicate whether the horizontal transform is skipped for a video block. Each combination of left and right TU boundaries, namely, PU-PU, non-PU-non-PU, PU-non-PU, and non-PU-PU, may be assigned a different context. Similarly, four contexts may be assigned for coding a bin used to indicate whether the vertical transform is skipped for a video block. Alternatively, the four contexts may be shared between the horizontal and vertical transform indicator bins. It should be noted that instead of four contexts for each indicator, it is possible to use another number of contexts. For example, one context may be assigned to a bin if the boundary combination is PU-PU or non-PU-non-PU, and another context may be assigned to a bin if the boundary combination is PU-non-PU or PU-non-PU.

Figure 10:
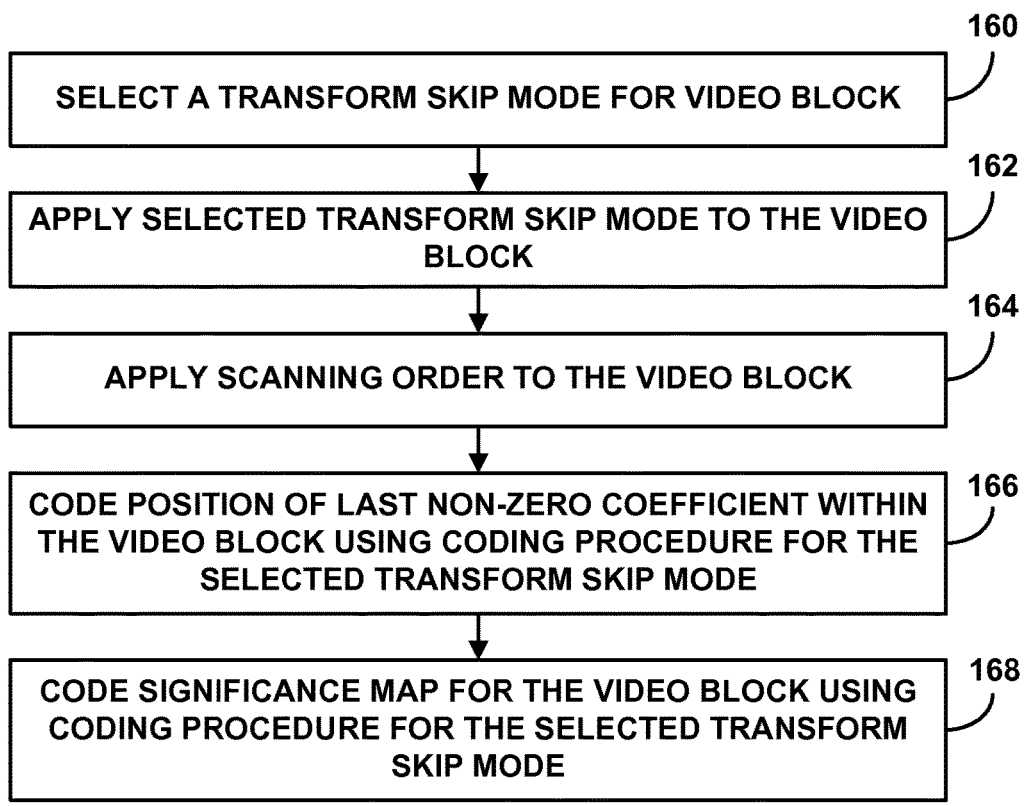
FIG. 10 is a flowchart illustrating an example operation of coding significant coefficient information for a video block using a coding procedure defined based on a selected transform skip mode.

FIG. 10 is a flowchart illustrating an example operation of coding significant coefficient information for a video block using a coding procedure defined based on a selected transform skip mode. The example operation illustrated in FIG. 10 is described with respect to video encoder 20 from FIG. 2. In other examples, the example operation may be described with respect to video decoder 30 from FIG. 3, which performs a generally reciprocal coding process as video encoder 20.

Mode select module 40 of video encoder 20 selects a transform skip mode for a video block or TU of a CU (160). Transform module 52 then applies the selected transform skip mode to residual pixel values of the video block (162). After the transform, entropy encoding module 56 applies a scanning order to the coefficients of the video block (164). Entropy encoding module 56 then codes a position of a last non-zero coefficient within the video block using a coding procedure for the selected transform skip mode (166). Entropy encoding module 56 also codes significance map for the video block using coding procedure for the selected transform skip mode (168).

Video encoder 20 signals the selected transform skip mode to video decoder 30. Entropy decoding module 80 of video decoder 30 then selects the transform skip mode based on the received indication and performs a reciprocal process as that described above to reconstruct the residual pixel values to decode the video block.

Figure 11:
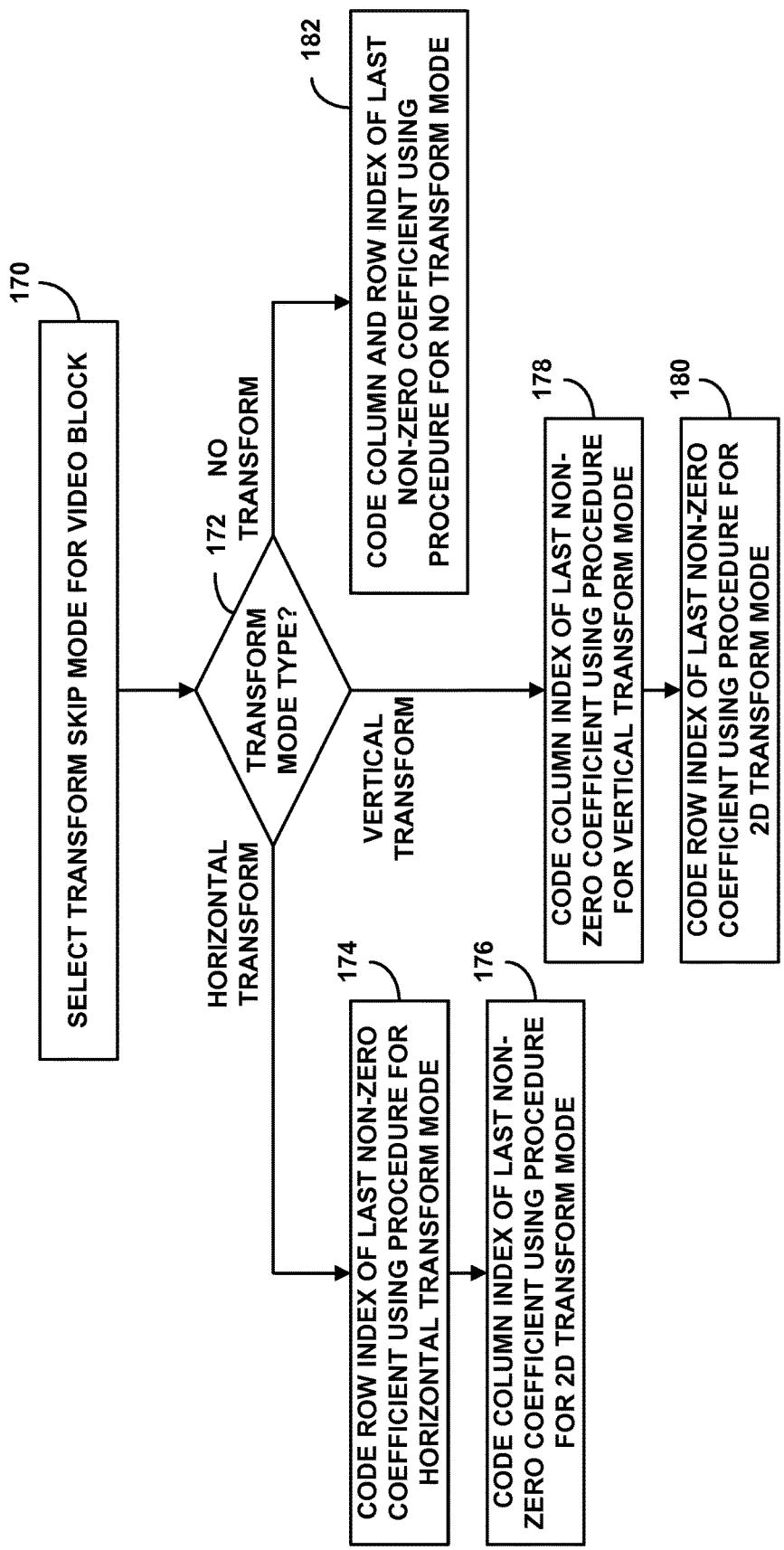
FIG. 11 is a flowchart illustrating an example operation of coding a position of a last non-zero coefficient within a video block using coding procedures defined for a vertical one-dimensional transform, a horizontal one-dimensional transform, and no transform.

FIG. 11 is a flowchart illustrating an example operation of coding a position of a last non-zero coefficient within a video block using coding procedures defined for a vertical one-dimensional transform, a horizontal one-dimensional transform, and no transform. When a two-dimensional transform mode is selected, the position of the last non-zero coefficient within the video block is coded using conventional coding procedures defined for the two-dimensional transform and are not illustrated in FIG. 11. The example operation illustrated in FIG. 11 is described with respect to video encoder 20 from FIG. 2. In other examples, the example operation may be described with respect to video decoder 30 from FIG. 3, which performs a generally reciprocal coding process as video encoder 20.

Mode select module 40 of video encoder 20 selects a transform skip mode for a video block or a TU of a CU (170). Entropy encoding module 56 then codes a position of a last non-zero coefficient within the video block using coding procedures defined based at least in part on the type of transform skip mode selected (172).

When the transform skip mode comprises a horizontal one-dimensional transform mode ("horizontal transform" branch of 172), entropy encoding module 56 codes a row index of the last non-zero coefficient using a coding procedure defined for coding the row index for the horizontal one-dimensional transform mode (174). Entropy encoding module 56 codes a column index of the last non-zero coefficient using a coding procedure defined for coding the column index for a two-dimensional transform mode (176).

In one example, as described above, the coding procedure for the horizontal one-dimensional transform mode may comprise coding the row index of the last non-zero coefficient with a fixed number of bits using CABAC bypass mode. In another example, the coding procedure for the horizontal one-dimensional transform mode may comprise coding the row index of the last non-zero coefficient based on a height of the video block using CABAC. In a further example, the coding procedure for the horizontal one-dimensional transform mode may comprise not coding the row index and instead only coding the column index of the last non-zero coefficient and coding a significance map for all coefficients within the indicated column of the video block to identify positions of the non-zero coefficients within the column.

When the transform skip mode comprises a vertical one-dimensional transform mode ("vertical transform" branch of 172), entropy encoding module 56 codes a column index of the last non-zero coefficient using a coding procedure defined for coding the column index for the vertical one-dimensional transform mode (178). Entropy encoding module 56 codes a row index of the last non-zero coefficient using a coding procedure defined for coding the row index for a two-dimensional transform mode (180).

In one example, the coding procedure for the vertical one-dimensional transform mode may comprise coding a column index of the last non-zero coefficient with a fixed number of bits using CABAC bypass mode. In another example, the coding procedure for the vertical one-dimensional transform mode may comprise coding the column index of the last non-zero coefficient based on a width of the video block using CABAC. In a further example, the coding procedure for the vertical one-dimensional transform mode may comprise not coding the column index and instead only coding the row index of the last non-zero coefficient and coding a significance map for all coefficients within the indicated row of the video block to identify positions of the non-zero coefficients within the row.

When the transform skip mode comprises a no transform mode ("no transform" branch of 172), entropy encoding module 56 codes a row index and a column index of the last non-zero coefficient using a coding procedure defined for coding the row index and the column index for the no transform mode (182). In one example, the coding procedure for the no transform mode may comprise coding both the row index and the column index of the last non-zero coefficient with a fixed number of bits using CABAC bypass mode. In another example, the coding procedure for the no transform mode may comprise coding both the row index and the column index of the last non-zero coefficient based on a size of the video block using CABAC. In a further example, the coding procedure for the no transform mode may comprise not coding either the row index or the column index, and instead coding a significance map for all coefficients within the video block to identify positions of the non-zero coefficients within the video block.

Video encoder 20 signals the selected transform skip mode to video decoder 30. Entropy decoding module 80 of video decoder 30 then selects the transform skip mode based on the received indication and performs a reciprocal process as that described above to decode the position of the last non-zero coefficient within the video block using coding procedures based on the selected transform skip mode.

Figure 12:
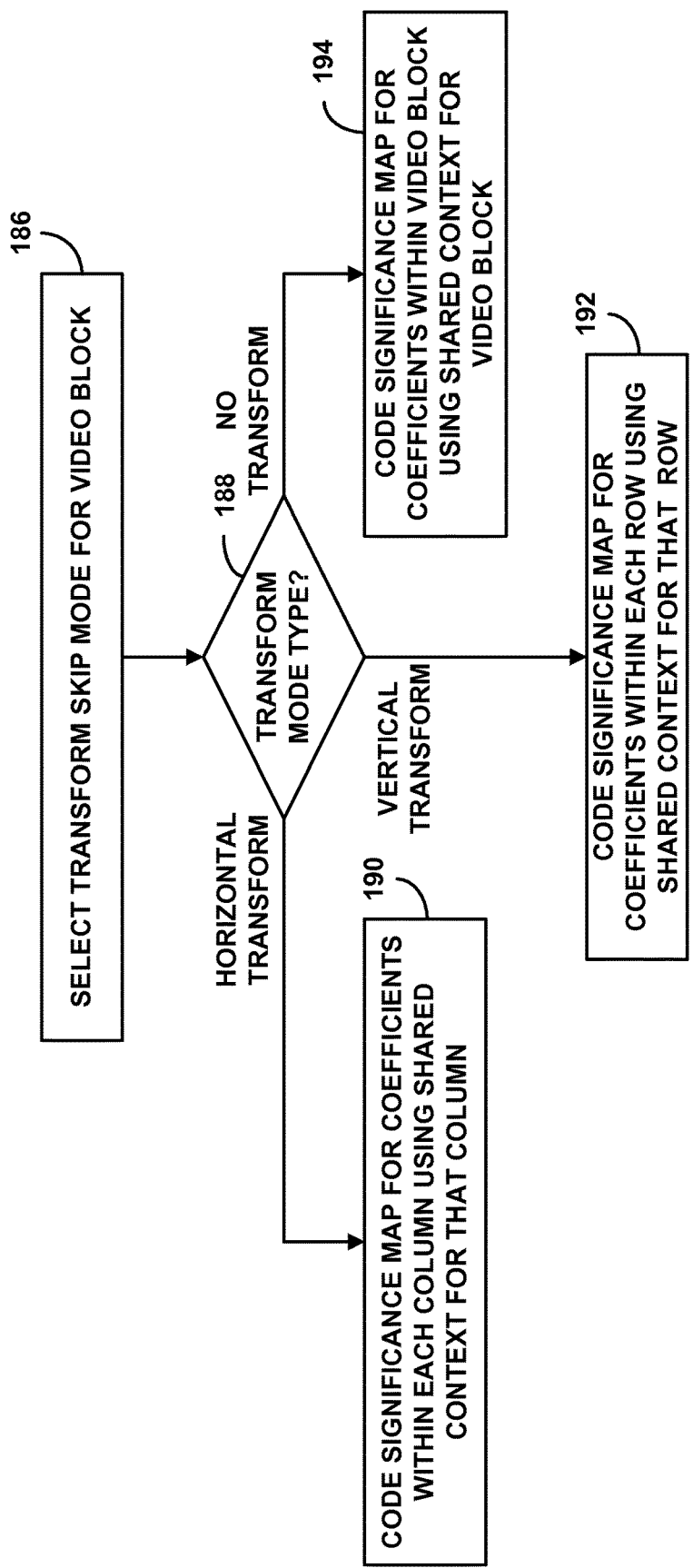
FIG. 12 is a flowchart illustrating an example operation of coding a significance map for a video block using shared contexts defined for a vertical one-dimensional transform, a horizontal one-dimensional transform, and no transform.

FIG. 12 is a flowchart illustrating an example operation of coding a significance map for a video block using shared contexts defined for a vertical one-dimensional transform, a horizontal one-dimensional transform, and no transform. When a two-dimensional transform mode is selected, the significance map for the video block is coded using conventional coding procedures defined for the two-dimensional transform and are not illustrated in FIG. 12. The example operation illustrated in FIG. 12 is described with respect to video encoder 20 from FIG. 2. In other examples, the example operation may be described with respect to video decoder 30 from FIG. 3, which performs a generally reciprocal coding process as video encoder 20.

Transform skip mode select module 48 of video encoder 20 selects a transform skip mode for a video block or a TU of a CU (186). Entropy encoding module 56 then codes a significance map for the video block using shared contexts defined based at least in part on the type of transform skip mode selected (188). In some cases, entropy encoding module 56 may use the shared contexts defined for the selected transform skip mode to code 4×4 or 8×8 video blocks. In others cases, entropy encoding module 56 may code a significance map for 16×16 or 32×32 blocks transformed using one of a vertical one-dimensional transform, a vertical one-dimensional transform, or no transform, using contexts shared with a same size block for which a two-dimensional transform mode is applied. In other cases, entropy encoding module 56 may use the shared contexts defined for the selected transform skip mode to code video blocks of any size.

When the transform skip mode comprises a horizontal one-dimensional transform mode ("horizontal transform" branch of 188), entropy encoding module 56 codes a significance map for coefficients within a given column of the video block using a single shared context for that column (190). In this case, a different shared context may be defined for each column of coefficients within the video block. In some cases, two or more columns of coefficients may share the same context.

When the transform skip mode comprises a vertical one-dimensional transform mode ("vertical transform" branch of 188), entropy encoding module 56 codes a significance map for coefficients within a given row of the video block using a single shared context for that row (192). In this case, a different shared context may be defined for each row of coefficients within the video block. In some cases, two or more rows of coefficients may share the same context.

When the transform skip mode comprises a no transform mode ("no transform" branch of 188), entropy encoding module 56 codes a significance map for all coefficients within the video block using a single shared context for the video block (194). In this case, the single context may be defined for the entire video block and all coefficients of the video block may be coded using the single shared context.

Video encoder 20 signals the selected transform skip mode to video decoder 30. Entropy decoding module 80 of video decoder 30 then selects the transform skip mode based on the received indication and performs a reciprocal process as that described above to decode the significance map for the video block using coding procedures based on the selected transform skip mode and the size of the video block.

Figure 13:
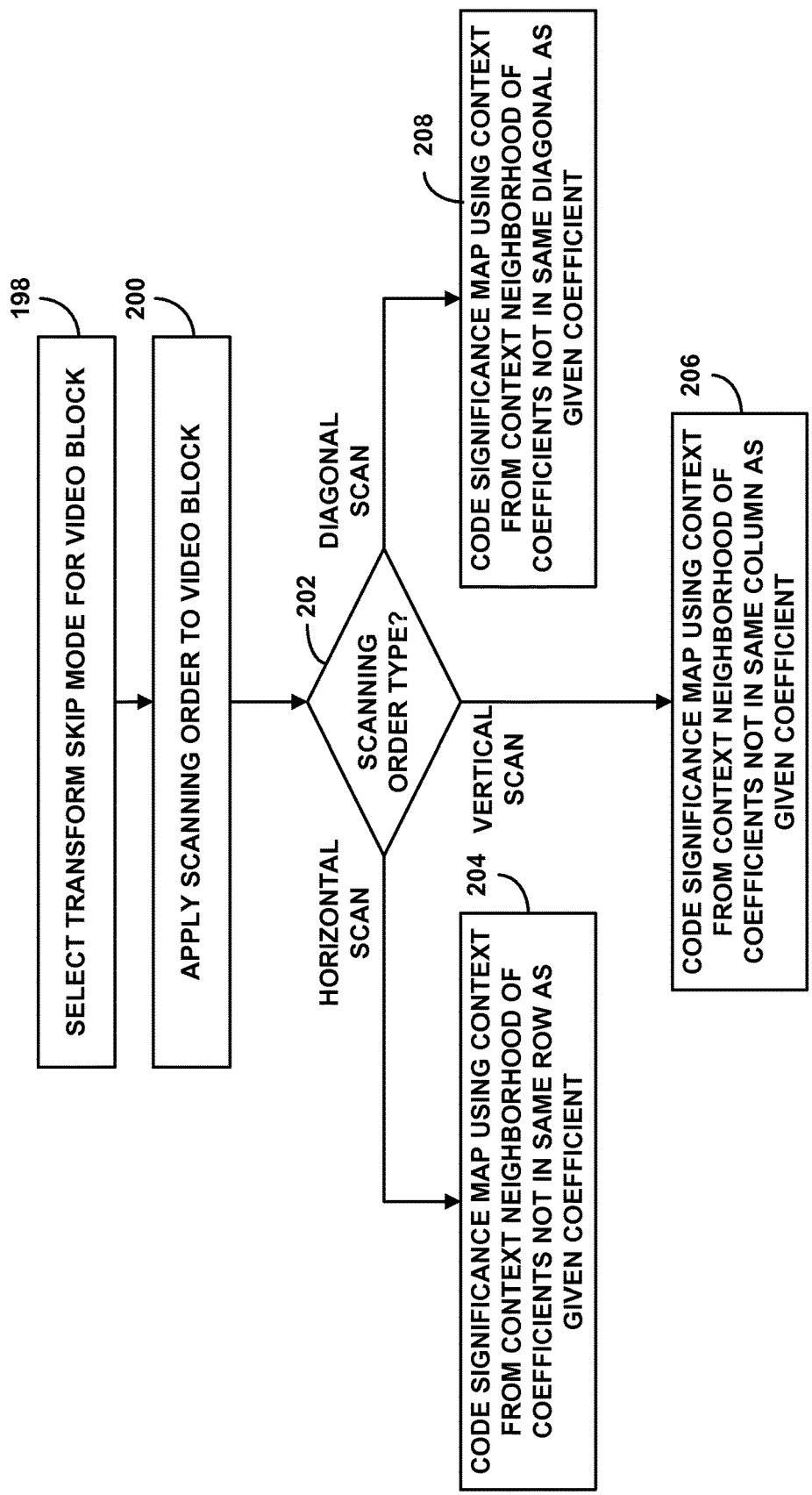
FIG. 13 is a flowchart illustrating an example operation of coding a significance map for a video block using contexts determined by a context neighborhood of coefficients that depends on a scanning order for the video block.

FIG. 13 is a flowchart illustrating an example operation of coding a significance map for a video block using contexts determined by a context neighborhood of coefficients that depends on a scanning order for the video block. The example operation illustrated in FIG. 13 is described with respect to video encoder 20 from FIG. 2. In other examples, the example operation may be described with respect to video decoder 30 from FIG. 3, which performs a generally reciprocal coding process as video encoder 20.

Transform skip mode select module 48 of video encoder 20 selects a transform skip mode for a video block or a TU of a CU (198). Entropy encoding module 56 applies a scanning order to the video block of quantized transform coefficients (200). Entropy encoding module 56 then codes a significance map for the video block in the transform skip mode using contexts determined by a context neighborhood of coefficients that depends on the type of scanning order applied to the video block (202). The technique of defining the context neighborhood based on the type of scanning order enables parallel context processing for all coefficients in a current scan line of the scanning order.

In some cases, entropy encoding module 56 may use the context neighborhood of coefficients that depends on the type of scanning order to determine a context used to code 4×4 or 8×8 video blocks. In other cases, entropy encoding module 56 may code a significance map for 16×16 or 32×32 blocks transformed using one of a vertical one-dimensional transform, a vertical one-dimensional transform, or no transform, using contexts determined by a context neighborhood for the two-dimensional transform mode. In other cases, entropy encoding module 56 may use the context neighborhood of coefficients that depends on the type of scanning order to determine a context uses to code video blocks of any size.

When the transform skip mode comprises a horizontal scanning order ("horizontal scan" branch of 202), entropy encoding module 56 codes a significance map for a given coefficient within the video block using a context determined by a context neighborhood of coefficients that does not include coefficients in the same row as the given coefficient (204). In this way, the context neighborhood used to determine the context for the given coefficient will not include any coefficients in the same scan line as the given coefficient. Context processing may be performed in parallel for all the coefficients in the same row as the given coefficient.

When the transform skip mode comprises a vertical scanning order ("vertical scan" branch of 202), entropy encoding module 56 codes a significance map for a given coefficient within the video block using a context determined by a context neighborhood of coefficients that does not include coefficients in the same column as the given coefficient (206). In this way, the context neighborhood used to determine the context for the given coefficient will not include any coefficients in the same scan line as the given coefficient. Context processing may be performed in parallel for all the coefficients in the same column as the given coefficient.

When the transform skip mode comprises a diagonal scanning order ("diagonal scan" branch of 202), entropy encoding module 56 codes a significance map for a given coefficient within the video block using a context determined by a context neighborhood of coefficients that does not include coefficients in the same diagonal as the given coefficient (208). In this way, the context neighborhood used to determine the context for the given coefficient will not include any coefficients in the same scan line as the given coefficient. Context processing may be performed in parallel for all the coefficients in the same diagonal as the given coefficient.

Video encoder 20 signals the selected transform skip mode to video decoder 30. Entropy decoding module 80 of video decoder 30 then selects the transform skip mode based on the received indication and performs a reciprocal process as that described above to decode the significance map for the video block in the transform skip mode using contexts determined by a context neighborhood of coefficients that depends on the type of scanning order applied to the video block.

Figure 14:
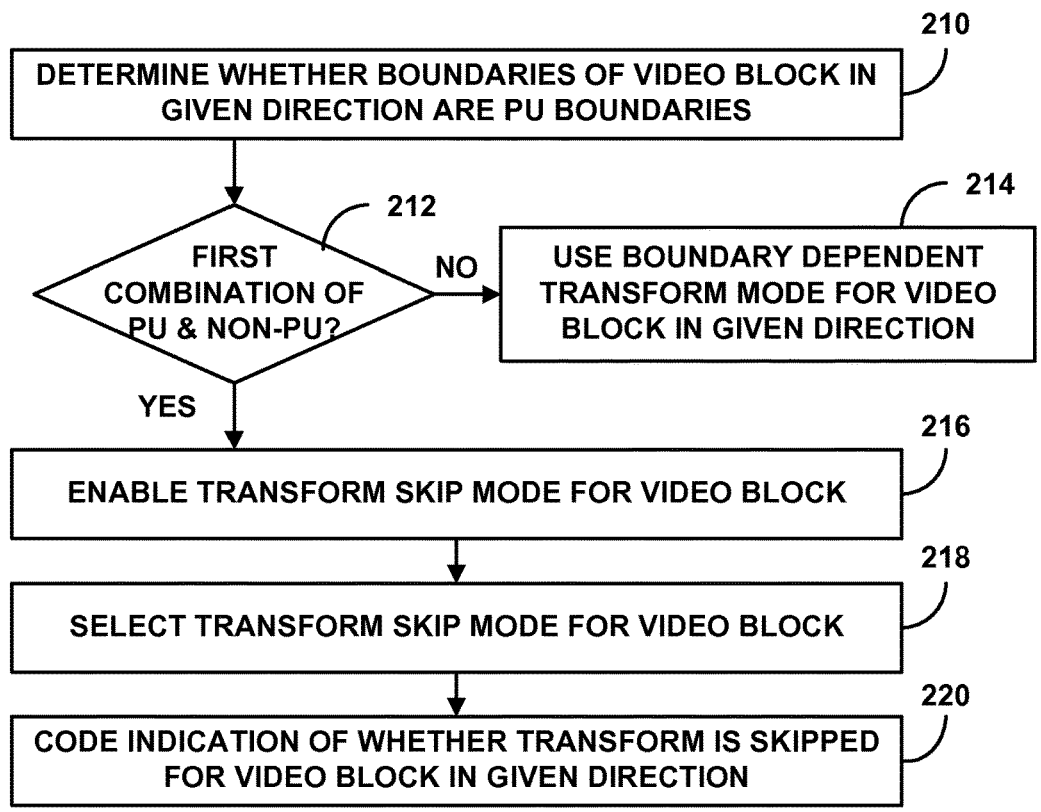
FIG. 14 is a flowchart illustrating an example operation of enabling a transform skip mode for a video block based on whether boundaries of the video block are prediction unit boundaries.

FIG. 14 is a flowchart illustrating an example operation of enabling a transform skip mode for a video block based on whether boundaries of the video block are prediction unit boundaries. The example operation illustrated in FIG. 14 is described with respect to video encoder 20 from FIG. 2. In other examples, the example operation may be described with respect to video decoder 30 from FIG. 3, which performs a generally reciprocal coding process as video encoder 20.

Transform skip mode select module 48 of video encoder 20 determines whether boundaries of a video block, or TU of a CU, in a given direction are PU boundaries (210). For example, in a vertical direction, transform skip mode select module 48 may determine whether a top edge and a bottom edge of the video block are PU boundaries or non-PU boundaries. In a horizontal direction, transform skip mode select module 48 may determine whether a right edge and a left edge of the video block are PU boundaries or non-PU boundaries.

When the boundaries of the video block in the given direction comprise a first combination of PU and non-PU boundaries ("YES" branch of 212), then transform skip mode select module 48 enables the transform skip mode for the video block (216). As an example, when the edges of the video block in the given direction are both PU boundaries, i.e., a PU-PU combination, the transform skip mode is enabled for the video block to allow a transform in the given direction to be skipped. Otherwise, when the boundaries of the video block in the given direction comprise a combination of PU and non-PU boundaries that is different than the first combination ("NO" branch of 212), then transform skip mode select module 48 uses the boundary dependent transform mode to determine a type of transform, e.g., a discrete cosine transform (DCT)-II, a DCT-IV, or a discrete sine transform (DST)-VII, for the video block in the given direction (214).

In one example, once the transform skip mode is enabled for the video block (216), transform module 52 skips a transform for the video block in the given direction. In this case, if the boundary combination of the video block in a horizontal direction is a PU-PU combination, transform module 52 skips the horizontal transform. In this case, video encoder 20 does not need to signal an indication of whether the transform in the given direction is performed or skipped. Instead, video decoder 30 determines whether to perform or skip the transform for the video block in the given direction based on whether the boundaries of the video block are PU boundaries.

In another example, illustrated in FIG. 14, once the transform skip mode is enabled for the video block (216), mode select module 40 of video encoder 20 selects a transform skip mode for the video block or TU (218). In this case, if the boundary combination of the video block in a horizontal direction is a PU-PU combination, then transform skip mode select module 48 selects one of a two-dimensional transform mode, a vertical one-dimensional transform mode, a horizontal one-dimensional transform mode, or a no transform mode for the video block. Entropy encoding module 56 then codes an indication of whether a transform is skipped for the video block in the given direction (220). For example, entropy encoding module 56 may code an indication of whether the horizontal transform is performed or skipped for the video block in the horizontal direction. In some cases, the indication of whether a transform is skipped in a given direction may be used to identify the selected transform skip mode for the video block. For example, if the horizontal transform is skipped, then the selected transform skip mode comprises either the vertical one-dimensional transform mode or the no transform mode.

Entropy decoding module 80 of video decoder 30 performs a reciprocal process as that described above to enable the transform skip mode for the video block based on whether boundaries of the video block are prediction unit boundaries. When the transform skip mode is enabled for the video block, entropy decoding module 80 selects the transform skip mode for the video block based on either the determined boundaries of the video block or indications of whether transforms were skipped in the horizontal and vertical directions.

Figure 15:
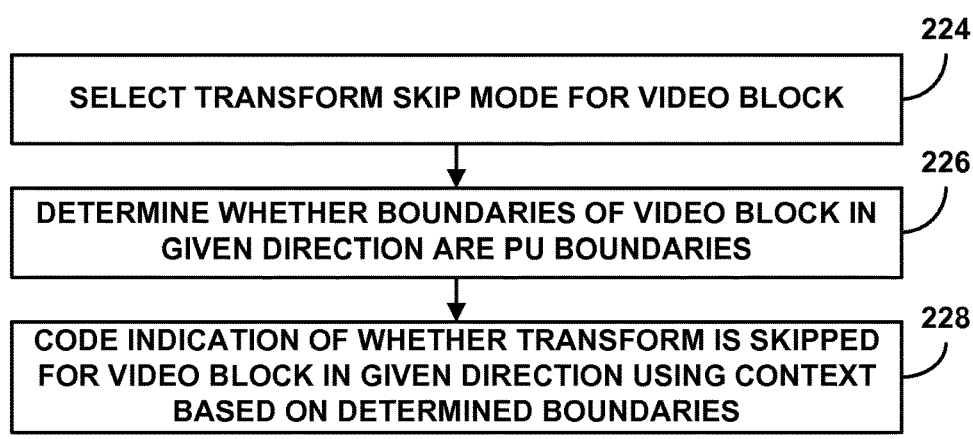
FIG. 15 is a flowchart illustrating an example operation of coding an indication of a selected transform skip mode for a video block based on whether boundaries of the video block are prediction unit boundaries.

FIG. 15 is a flowchart illustrating an example operation of coding an indication of a selected transform skip mode for a video block based on whether boundaries of the video block are prediction unit boundaries. The example operation illustrated in FIG. 15 is described with respect to video encoder 20 from FIG. 2. In other examples, the example operation may be described with respect to video decoder 30 from FIG. 3, which performs a generally reciprocal coding process as video encoder 20.

Transform skip mode select module 48 of video encoder 20 selects a transform skip mode for a video block or a TU of a CU (224). Transform skip mode select module 48 also determines whether boundaries of the video block or TU in a given direction are PU boundaries (226). For example, in a vertical direction, transform skip mode select module 48 may determine whether a top boundary and a bottom boundary of the video block are PU boundaries or non-PU boundaries. In a horizontal direction, transform skip mode select module 48 may determine whether a right boundary and a left boundary of the video block are PU boundaries or non-PU boundaries.

Entropy encoding module 56 then codes an indication of whether a transform is skipped for the video block in the given direction using a context defined based at least in part on the determined boundaries of the video block (228). For example, entropy encoding module 56 may code an indication of whether the horizontal transform is performed or skipped for the video block in the horizontal direction. The indication of whether a transform is skipped in a given direction may be used to identify the selected transform skip mode for the video block. For example, if the horizontal transform is skipped, then the selected transform skip mode comprises either the vertical one-dimensional transform mode or the no transform mode.

In some cases, each potential combination of boundaries in a given direction may be assigned a different context, i.e., four different contexts. Entropy encoding module 56 uses the context associated with the combination of PU and non-PU boundaries for the video block in the given direction to code the indication of whether the transform is performed or skipped for the video block in the given direction. In other cases, some contexts may be shared for different combinations of PU and non-PU boundaries. In some examples, the contexts in the vertical direction may be different than the contexts in the horizontal direction. In other examples, the contexts may be shared between the different directions.

Entropy decoding module 80 of video decoder 30 performs a reciprocal process as that described above to decode indications of whether a transform is skipped for the video block in the given direction using a context defined based on whether boundaries of the video block are prediction unit boundaries. Entropy decoding module 80 then selects the transform skip mode for the video block based on the decoded indications.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data comprising:
  selecting a first transform mode, for coding a first residual block of video data, from a plurality of possible transform modes, wherein the plurality of possible transform modes comprises a no transform mode and at least one other transform mode, wherein the no transform mode comprises coding a residual block without applying a transform to the residual block such that a residual block coded with the no transform mode is represented in a bitstream of encoded video data as sample difference values that represent differences between sample values for an original block of video data and a predictive block video data, and wherein the at least one other transform mode comprises coding the residual block by applying a transform to the residual block such that a residual block coded with one of the at least one other transform mode is represented in the bitstream of encoded video data as transform coefficient values;
  applying the selected first transform mode to the first residual block;
  in response to the selected first transform mode being the no transform mode, coding significant coefficient information for the first residual block using a first coding procedure defined based at least in part on the selected first transform mode being the no transform mode, wherein the significant coefficient information for the first residual block comprises a position of a last non-zero coefficient for the first residual block and significance information for coefficients of the first residual block, wherein coding significant coefficient information for the first residual block comprises coding the position of the last non-zero coefficient including:
    coding a row index that indicates a row of the last non-zero coefficient within the first residual block using a coding procedure defined for coding the row index for the no transform mode; and
    coding a column index that indicates a column of the last non-zero coefficient within the first residual block using the coding procedure defined for coding the column index for the no transform mode;
  in response to the selected first transform mode being the no transform mode, coding the significance information for the coefficients of the first residual block using a single shared context for the first residual block; and
  in response to a selected second transform mode for a second residual block being one of the at least one other transform modes, coding significant coefficient information for the second residual block using a second coding procedure defined based at least in part on the selected second transform mode being the one of the at least one other transform modes, wherein the first coding procedure is different than the second coding procedure.

2. The method of claim 1, wherein the selected second transform mode comprises one of a two-dimensional transform mode, a vertical one-dimensional transform mode, or a horizontal one-dimensional transform mode.

3. The method of claim 1, further comprising applying a scanning order to the second residual block, wherein the position of the last non-zero coefficient within the second residual block depends on the applied scanning order, and wherein the scanning order comprises one of a zig-zag scanning order, a diagonal scanning order, a horizontal scanning order and a vertical scanning order.

4. The method of claim 1, wherein coding the significant coefficient information for the first residual block comprises coding the position of the last non-zero coefficient including at least one of the column index that indicates the column of the last non-zero coefficient within the first residual block or the row index that indicates the row of the last non-zero coefficient within the first residual block using a fixed number of bits.

5. The method of claim 4, wherein the fixed number of bits used to code the column index of the last non-zero coefficient is based on a width of the first residual block, and wherein the fixed number of bits used to code the row index of the last non-zero coefficient is based on a height of the first residual block.

6. The method of claim 4, wherein coding one of the column index or the row index of the last non-zero coefficient comprises:
   binarizing the one of the column index or the row index of the last non-zero coefficient into the fixed number of bits; and
   coding each of the bits of the binarized index using context adaptive binary arithmetic coding (CABAC) in bypass mode.

7. The method of claim 1, wherein, coding the significant coefficient information for the first residual block comprises coding the position of the last non-zero coefficient including at least one of the column index that indicates the column of the last non-zero coefficient within the first residual block or the row index that indicates the row of the last non-zero coefficient within the first residual block based on a size of the first residual block.

8. The method of claim 7, wherein coding the column index of the last non-zero coefficient comprises coding (B−1−last) using context adaptive binary arithmetic coding (CABAC), wherein B is the width of the first residual block and last is the column index of the last non-zero coefficient.

9. The method of claim 7, wherein coding the row index of the last non-zero coefficient comprises coding (B−1−last) using context adaptive binary arithmetic coding (CABAC), wherein B is the height of the first residual block and last is the row index of the last non-zero coefficient.

10. The method of claim 1, wherein coding the significant coefficient information for the first residual block comprises coding the significance information for all coefficients within the first residual block, without coding the position of the last non-zero coefficient within the first residual block, wherein the significance information identifies the position of each non-zero coefficient within the first residual block.

11. The method of claim 1, wherein coding the position of the last non-zero coefficient comprises coding binary bits that represent indices of the last non-zero coefficient within the first residual block in a specific order based on the selected transform skip mode, wherein the order based on the selected transform skip mode groups together bypass-coded binary bits for the row index and the column index of the last non-zero coefficient.

12. The method of claim 1, wherein, coding the significant coefficient information for the first residual block comprises coding the significance information of the first residual block using contexts shared with blocks for which a two-dimensional transform mode is applied.

13. The method of claim 1, further comprising applying one of a plurality of scanning orders to the first residual block, and wherein coding the significant coefficient information for the first residual block comprises coding the significance information for a given coefficient within the first residual block using a context determined by a context neighborhood of coefficients that depends on the scanning order.

14. The method of claim 13, wherein applying one of the scanning orders comprises applying a vertical scanning order to the first residual block, and wherein the context neighborhood for the given coefficient does not include coefficients in a same column as the given coefficient.

15. The method of claim 13, wherein applying one of the scanning orders comprises applying a horizontal scanning order to the first residual block, and wherein the context neighborhood for the given coefficient does not include coefficients in a same row as the given coefficient.

16. The method of claim 13, wherein applying one of the scanning orders comprises applying a diagonal scanning order to the first residual block, and wherein the context neighborhood for the given coefficient does not include coefficients on a same diagonal as the given coefficient.

17. The method of claim 1, wherein coding video data comprises encoding video data, further comprising signaling an indication of the selected transform mode, and encoding the significant coefficient information for the first residual block using the coding procedure defined based at least in part on the selected transform skip mode.

18. The method of claim 1, wherein coding video data comprises decoding video data, further comprising receiving an indication of the selected transform mode, and decoding the significant coefficient information for the first residual block using the coding procedure defined based at least in part on the selected transform skip mode.

19. A video coding device comprising:
   a memory that stores video data; and
   one or more processors configured to:
   select a first transform mode, for coding a first residual block of video data, from a plurality of possible transform modes, wherein the plurality of possible transform modes comprises a no transform mode and at least one other transform mode, wherein the no transform mode comprises coding a residual block without applying a transform to the residual block such that a residual block coded with the no transform mode is represented in a bitstream of encoded video data as sample difference values that represent differences between sample values for an original block of video data and a predictive block video data, and wherein the at least one other transform mode comprises coding the residual block by applying a transform to the residual block such that a residual block coded with one of the at least one other transform mode is represented in the bitstream of encoded video data as transform coefficient values;
   apply the selected first transform mode to the first residual block;
   in response to the selected first transform mode being the no transform mode, code significant coefficient information for the first residual block using a first coding procedure defined based at least in part on the selected first transform mode being the no transform mode, wherein the significant coefficient information for the first residual block comprises a position of a last non-zero coefficient for the first residual block and significance information for coefficients of the first residual block, wherein coding significant coefficient information for the first residual block comprises coding the position of the last non-zero coefficient including:
      coding a row index that indicates a row of the last non-zero coefficient within the first residual block using a coding procedure defined for coding the row index for the no transform mode; and
      coding a column index that indicates a column of the last non-zero coefficient within the first residual block using the coding procedure defined for coding the column index for the no transform mode;

in response to the selected first transform mode being the no transform mode, code the significance information for the coefficients of the first residual block using a single shared context for the first residual block; and in response to a selected second transform mode for a second residual block being one of the at least one other transform modes, code significant coefficient information for the second residual block using a second coding procedure defined based at least in part on the selected second transform mode being the one of the at least one other transform modes, wherein the first coding procedure is different than the second coding procedure.

20. The video coding device of claim 19, wherein the selected second transform mode comprises one of a two-dimensional transform mode, a vertical one-dimensional transform mode, or a horizontal one-dimensional transform mode.

21. The video coding device of claim 19, wherein the one or more processors are configured to apply a scanning order to the second residual block, wherein the position of the last non-zero coefficient within the second residual block depends on the applied scanning order, and wherein the scanning order comprises one of a zig-zag scanning order, a diagonal scanning order, a horizontal scanning order and a vertical scanning order.

22. The video coding device of claim 19, wherein, the one or more processors are configured to code the position of the last non-zero coefficient including at least one of the column index that indicates the column of the last non-zero coefficient within the first residual block or the row index that indicates the row of the last non-zero coefficient within the first residual block using a fixed number of bits.

23. The video coding device of claim 22, wherein the fixed number of bits used to code the column index of the last non-zero coefficient is based on a width of the first residual block, and wherein the fixed number of bits used to code the row index of the last non-zero coefficient is based on a height of the first residual block.

24. The video coding device of claim 22, wherein the processor is configured to:
binarize the one of the column index or the row index of the last non-zero coefficient into the fixed number of bits; and
code each of the bits of the binarized index using context adaptive binary arithmetic coding (CABAC) in bypass mode.

25. The video coding device of claim 19, wherein the one or more processors are configured to code the position of the last non-zero coefficient including at least one of the column index that indicates the column of the last non-zero coefficient within the first residual block or the row index that indicates the row of the last non-zero coefficient within the first residual block based on a size of the first residual block.

26. The video coding device of claim 25, wherein the one or more processors are configured to code (B−1−last) using context adaptive binary arithmetic coding (CABAC) in order to code the column index of the last non-zero coefficient, wherein B is the width of the first residual block and last is the column index of the last non-zero coefficient.

27. The video coding device of claim 25, wherein the one or more processors are configured to code (B−1−last) using context adaptive binary arithmetic coding (CABAC) in order to code the row index of the last non-zero coefficient, wherein B is the height of the first residual block and last is the row index of the last non-zero coefficient.

28. The video coding device of claim 19, wherein the one or more processors are configured to code the significance information for all coefficients within the first residual block, without coding the position of the last non-zero coefficient within the first residual block, wherein the significance information identifies the position of each non-zero coefficient within the first residual block.

29. The video coding device of claim 19, wherein the processor is configured to code binary bits that represent indices of the last non-zero coefficient within the first residual block in a specific order based on the selected transform skip mode, wherein the order based on the selected transform skip mode groups together bypass-coded binary bits for the row index and the column index of the last non-zero coefficient.

30. The video coding device of claim 19, wherein the one or more processors are configured to code the significance information of the first residual block using contexts shared with blocks for which a two-dimensional transform mode is applied.

31. The video coding device of claim 19, wherein the one or more processors are configured to:
apply one of a plurality of scanning orders to the first residual block; and
code the significance information for a given coefficient within the first residual block using a context determined by a context neighborhood of coefficients that depends on the scanning order.

32. The video coding device of claim 31, wherein the one or more processors are configured to apply a vertical scanning order to the first residual block, and wherein the context neighborhood for the given coefficient does not include coefficients in a same column as the given coefficient.

33. The video coding device of claim 31, wherein the one or more processors are configured to apply a horizontal scanning order to the first residual block, and wherein the context neighborhood for the given coefficient does not include coefficients in a same row as the given coefficient.

34. The video coding device of claim 31, wherein the one or more processors are configured to apply a diagonal scanning order to the first residual block, and wherein the context neighborhood for the given coefficient does not include coefficients on a same diagonal as the given coefficient.

35. The video coding device of claim 19, wherein the video coding device comprises a video encoding device, and wherein the one or more processors are configured to signal an indication of the selected transform mode, and encode the significant coefficient information for the first residual block using the coding procedure defined based at least in part on the selected transform mode.

36. The video coding device of claim 19, the video coding device comprises a video decoding device, and wherein the one or more processors are configured to receive an indication of the selected transform mode, and decode the significant coefficient information for the first residual block using the coding procedure defined based at least in part on the selected transform mode.

37. A video coding device comprising:
means for selecting a first transform mode, for coding a first residual block of video data, from a plurality of possible transform modes, wherein the plurality of possible transform modes comprises a no transform mode and at least one other transform mode, wherein the no transform mode comprises coding a residual block without applying a transform to the residual block such that a residual block coded with the no transform mode is represented in a bitstream of encoded video data as sample difference values that represent differences between sample values for an original block of video data and a predictive block video data, and wherein the at least one other transform mode comprises coding the residual block by applying a transform to the residual block such that a residual block coded with one of the at least one other transform mode is represented in the bitstream of encoded video data as transform coefficient values;

means for applying the selected first transform mode to the first residual block;

means for coding significant coefficient information for the first residual block using a first coding procedure defined based at least in part on a selected first transform mode being the no transform mode, wherein the significant coefficient information for the first residual block comprises a position of a last non-zero coefficient for the first residual block and significance information for coefficients of the first residual block, wherein coding significant coefficient information for the first residual block comprises coding the position of the last non-zero coefficient including:

coding a row index that indicates a row of the last non-zero coefficient within the first residual block using a coding procedure defined for coding the row index for the no transform mode; and coding a column index that indicates a column of the last non-zero coefficient within the first residual block using the coding procedure defined for coding the column index for the no transform mode; and means for coding the significance information for the coefficients of the first residual block using a single shared context for the first residual block in response to the selected first transform mode being the no transform mode; and means for coding significant coefficient information for the second residual block using a second coding procedure defined based at least in part on a selected second transform mode being one of the at least one other transform modes, wherein the first coding procedure is different than the second coding procedure.

38. A non-transitory computer-readable medium comprising instructions for coding video data that when executed by a video coding device cause one or more programmable processors to:

select a first transform mode, for coding a first residual block of video data, from a plurality of possible transform modes, wherein the plurality of possible transform modes comprises a no transform mode and at least one other transform mode, wherein the no transform mode comprises coding a residual block without applying a transform to the residual block such that a residual block coded with the no transform mode is represented in a bitstream of encoded video data as sample difference values that represent differences between sample values for an original block of video data and a predictive block video data, and wherein the at least one other transform mode comprises coding the residual block by applying a transform to the residual block such that a residual block coded with one of the at least one other transform mode is represented in the bitstream of encoded video data as transform coefficient values;

apply the selected first transform mode to the first residual block;

in response to the selected first transform mode being the no transform mode, code significant coefficient information for the first residual block using a first coding procedure defined based at least in part on the selected first transform mode being the no transform mode, wherein the significant coefficient information for the first residual block comprises a position of a last non-zero coefficient for the first residual block and significance information for coefficients of the first residual block, wherein coding significant coefficient information for the first residual block comprises coding the position of the last non-zero coefficient including:

coding a row index that indicates a row of the last non-zero coefficient within the first residual block using a coding procedure defined for coding the row index for the no transform mode; and coding a column index that indicates a column of the last non-zero coefficient within the first residual block using the coding procedure defined for coding the column index for the no transform mode;

in response to the selected first transform mode being the no transform mode, code the significance information for the coefficients of the first residual block using a single shared context for the first residual block; and in response to a selected second transform mode for a second residual block being one of the at least one other transform modes, code significant coefficient information for the second residual block using a second coding procedure defined based at least in part on the selected second transform mode being the one of the at least one other transform modes, wherein the first coding procedure is different than the second coding procedure.

39. The method of claim 1, further comprising:

based on the significance information for the coefficients of the first residual block, decoding the first residual block;

adding the first residual block to the predictive block to form a reconstructed block;

performing one or more filtering operations on the reconstructed block; and outputting decoded video data comprising the filtered reconstructed block.

40. The video coding device of claim 19, wherein the processor is further configured to:

based on the significance information for the coefficients of the first residual block, decode the first residual block;

add the first residual block to the predictive block to form a reconstructed block;

perform one or more filtering operations on the reconstructed block; and output decoded video data comprising the filtered reconstructed block.

41. The method of claim 1, wherein coding the first residual block of video data comprises decoding the first residual block of video data, the method further comprising:

receiving the video data at a receiver of a wireless communication device;

storing the video data in a memory of the wireless communication device; and processing the video data on one or more processors of the wireless communication device.

42. The method of claim 41, wherein the wireless communication device comprises a telephone handset and wherein receiving the video data at the receiver of the wireless communication device comprises demodulating, according to a wireless communication standard, a signal comprising the video data.

43. The device of claim 19, wherein the device comprises a wireless communication device configured to decode the video data, the device further comprising a receiver configured to receive encoded video data.

44. The device of claim 43, wherein the wireless communication device comprises a telephone handset and wherein the receiver is configured to demodulate, according to a wireless communication standard, a signal comprising the encoded video data.

* * * * *